(12) United States Patent
Kunitake et al.

(10) Patent No.: US 8,489,705 B2
(45) Date of Patent: Jul. 16, 2013

(54) REPORT MANAGEMENT SYSTEM AND COMPUTER READABLE MEDIUM

(75) Inventors: Setsu Kunitake, Kanagawa (JP); Shigehisa Kawabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 86 days.

(21) Appl. No.: 13/020,990

(22) Filed: Feb. 4, 2011

(65) Prior Publication Data
US 2012/0047225 A1 Feb. 23, 2012

(30) Foreign Application Priority Data
Aug. 20, 2010 (JP) ................................. 2010-184716

(51) Int. Cl.
G06F 15/16 (2006.01)
(52) U.S. Cl.
USPC ............................ 709/217; 709/205; 709/201
(58) Field of Classification Search
USPC ......................................... 709/217, 201, 205
See application file for complete search history.

(56) References Cited

U.S. PATENT DOCUMENTS

| | | | | |
|---|---|---|---|---|
| 7,051,038 | B1 * | 5/2006 | Yeh et al. | 707/603 |
| 8,073,777 | B2 * | 12/2011 | Barry et al. | 705/50 |
| 2007/0094595 | A1 * | 4/2007 | Heck et al. | 715/700 |
| 2008/0084324 | A1 * | 4/2008 | Wallace et al. | 340/679 |

FOREIGN PATENT DOCUMENTS

| | | |
|---|---|---|
| JP | 2003-263551 A | 9/2003 |
| JP | 2007-188242 A | 7/2007 |

* cited by examiner

Primary Examiner — Kristie Shingles
(74) Attorney, Agent, or Firm — Sughrue Mion, PLLC

(57) ABSTRACT

A report management system includes: a first receiving unit that receives input of report identification information assigned to each of one or more reports to be collectively delivered to a receiver from a sender; an assigning unit that assigns group identification information to a group of the one or more reports to be collectively delivered; a registration unit that register, in a storage unit, the group identification information and each piece of the report identification information; an attached document generation unit that generates an attached document that is a document including the group identification information; a second receiving unit that receives, upon reception of one or more reports by the receiver from the sender together with the attached document, input of the group identification information included in the attached document received by the receiver; and an output unit that outputs information indicative of a result of comparison.

7 Claims, 15 Drawing Sheets

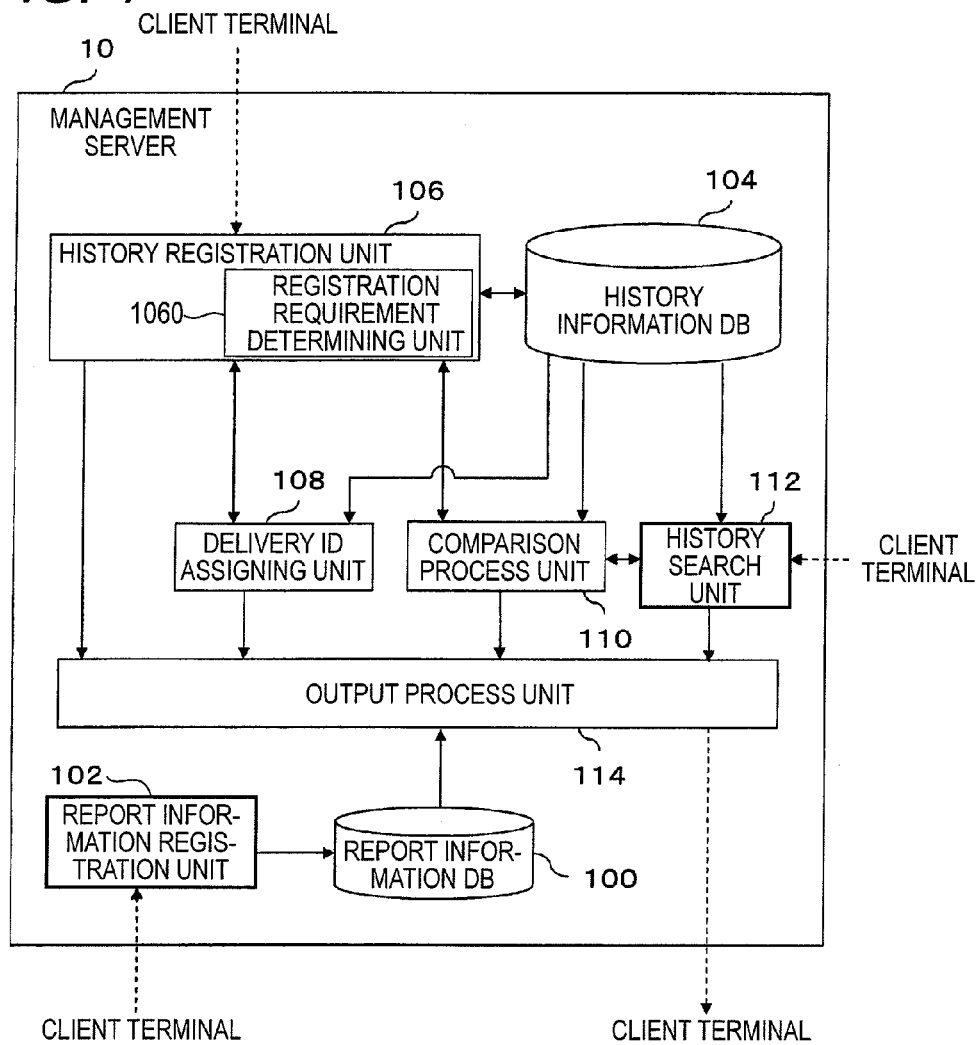

FIG. 6

| | OPERATION DATE AND TIME | OPERATION TYPE | REPORT ID | DELIVERY ID | USER ID | OPERATION LOCATION | RECEIPT STATUS |
|---|---|---|---|---|---|---|---|
| a1 | 2010.6.3 10:05:40 | DELIVERY | d001 | s001 | userX | BRANCH OFFICE A | |
| a2 | 2010.6.3 10:05:40 | DELIVERY | d002 | s001 | userX | BRANCH OFFICE A | |
| a3 | 2010.6.3 10:05:40 | DELIVERY | d003 | s001 | userX | BRANCH OFFICE A | |
| b1 | 2010.6.4 12:55:31 | RECEIPT | d001 | s001 | userY | BRANCH OFFICE B | RECEIVED |
| b2 | 2010.6.4 12:55:31 | RECEIPT | d002 | s001 | userY | BRANCH OFFICE B | RECEIVED |
| b3 | 2010.6.4 12:55:31 | RECEIPT | d003 | s001 | userY | BRANCH OFFICE B | RECEIVED |
| c1 | 2010.6.4 16:12:45 | APPROVAL | d002 | | userY | BRANCH OFFICE B | |
| c2 | 2010.6.4 16:15:12 | APPROVAL | d003 | | userY | BRANCH OFFICE B | |
| c3 | 2010.6.4 16:16:44 | PENDING | d001 | | userY | BRANCH OFFICE B | |
| d1 | 2010.6.5 09:30:26 | DELIVERY | d002 | s002 | userY | BRANCH OFFICE B | |
| d2 | 2010.6.5 09:30:26 | DELIVERY | d003 | s002 | userY | BRANCH OFFICE B | |
| d3 | 2010.6.5 09:30:26 | DELIVERY | d004 | s002 | userY | BRANCH OFFICE B | |
| d4 | 2010.6.5 09:30:26 | DELIVERY | d005 | s002 | userY | BRANCH OFFICE B | |
| d5 | 2010.6.5 09:30:26 | DELIVERY | d006 | s002 | userY | BRANCH OFFICE B | |

| | | | | | | |
|---|---|---|---|---|---|---|
| e1 — 2010.6.6 10:08:10 | RECEIPT | d001 | s002 | userZ | BRANCH OFFICE C | NOT INCLUDED IN LIST |
| e2 — 2010.6.6 10:08:10 | RECEIPT | d002 | s002 | userZ | BRANCH OFFICE C | RECEIVED |
| e3 — 2010.6.6 10:08:10 | RECEIPT | d004 | s002 | userZ | BRANCH OFFICE C | RECEIVED |
| e4 — 2010.6.6 10:08:10 | RECEIPT | d006 | s002 | userZ | BRANCH OFFICE C | RECEIVED |
| e5 — 2010.6.6 10:08:10 | RECEIPT | d003 | s002 | userZ | BRANCH OFFICE C | NOT RECEIVED |
| e6 — 2010.6.6 10:08:10 | RECEIPT | d005 | s002 | userZ | BRANCH OFFICE C | NOT RECEIVED |
| f1 — 2010.6.6 11:15:21 | RETURN | d001 | s002 | userZ | BRANCH OFFICE C | RETURNED |
| g1 — 2010.6.7 10:22:15 | REDELIVERY | d003 | s002 | userZ | BRANCH OFFICE B | |
| g2 — 2010.6.7 10:22:15 | REDELIVERY | d005 | s002 | userY | BRANCH OFFICE B | |
| h1 — 2010.6.8 10:05:13 | RECEIPT | d003 | s002 | userZ | BRANCH OFFICE C | RECEIVED |
| h2 — 2010.6.6 10:05:13 | RECEIPT | d005 | s002 | userZ | BRANCH OFFICE C | RECEIVED |

FIG. 7

| DELIVERY ID | NUMBER OF ITEMS |
|---|---|
| s001 | 3 |
| s002 | 5 |

FIG. 9

DELIVERY

REPORT TRACKING NUMBER d001
d002
d003       — r1

REGISTRATION

FIG. 10

DELIVERY COVER SHEET CONFIRMATION

DELIVERY LIST REGISTRATION NUMBER: s001

| TRACKING NUMBER | NAME |
| --- | --- |
| d001 | AAA |
| d002 | BBB |
| d003 | CCC |

DELIVERY COVER SHEET PRINT

FIG. 16

```
┌─────────────────────────────────────────┐
│   DELIVERY COVER SHEET CONFIRMATION     │
│ DELIVERY LIST REGIS-                    │
│ TRATION NUMBER      : s002              │
│     TRACKING                            │
│      NUMBER      NAME                   │
│       d002       BBB                    │
│       d003       CCC                    │
│       d004       DDD                    │
│       d005       EEE                    │
│       d006       FFF                    │
│                                         │
│                                         │
│          ( DELIVERY COVER SHEET PRINT ) │
└─────────────────────────────────────────┘
```

FIG. 17

| | | |
|---|---|---|
| COMPARISON RESULT | | |
| DELIVERY LIST REGIS- TRATION NUMBER | s002 | — r8 |
| REPORT TRACKING NUMBER | | |
| d001 | × NOT INCLUDED IN LIST | |
| d002 | ○ RECEIVED | |
| d004 | ○ RECEIVED | — r9 |
| d006 | ○ RECEIVED | |
| d003 | × NOT RECEIVED | |
| d005 | × NOT RECEIVED | |
| r10 — ※ THE NUMBERS OF ITEMS DO NOT MATCH | | (REGISTRATION) |

FIG. 18

```
                    RETURN
DELIVERY LIST REGIS-
TRATION NUMBER      s002                ─── r12

REPORT TRACKING NUMBER
   ┌─────────────────────────┐
   │ d001                    │          ─── r11
   │                         │
   └─────────────────────────┘

( REGISTRATION )
```

FIG. 19

```
                RECEIPT STATUS
DELIVERY LIST REGIS-  : s002
TRATION NUMBER
      TRACKING
       NUMBER      STATUS
        d001       RETURNED
        d002       RECEIVED
        d004       RECEIVED
        d006       RECEIVED
        d003       NOT RECEIVED
        d005       NOT RECEIVED
```

FIG. 20

```
                    DELIVERY
REPORT TRACK-
  ING NUMBER       NAME
   ┌─────────────────────────┐
   │  d003             CCC   │          ─── r13
   └─────────────────────────┘

⊚ REPORT d003 HAS ALREADY BEEN
     DELIVERED (DELIVERY LIST
     REGISTRATION NUMBER: s002)

( REGISTER )   ( DON'T REGISTER )
```

FIG. 21

```
┌─────────────────────────────────────────┐
│              DELIVERY                    │
├─────────────────────────────────────────┤
│ DELIVERY LIST REGISTRATION NUMBER : s002│
│                                          │
│   REPORT TRACK-     NAME                 │
│   ING NUMBER                             │
│  ┌─────────────────────────┐             │
│  │   d003         CCC      │────── r14   │
│  └─────────────────────────┘             │
│                                          │
│     d002        BBB    RECIEVED          │
│     d004        DDD    RECIEVED          │
│     d005        EEE    NOT RECIEVED      │
│     d006        FFF    RECIEVED          │
│                                          │
│   WILL YOU REGISTER THE                  │
│   ABOVE DESCRIPTIONS?                    │
│                                          │
│          ( YES )      ( NO )             │
└─────────────────────────────────────────┘
```

FIG. 22

```
┌─────────────────────────────────────────┐
│     DELIVERY COVER SHEET CONFIRMATION   │
├─────────────────────────────────────────┤
│ DELIVERY LIST REGIS-        : s002       │
│ TRATION NUMBER                           │
│                                          │
│ REPORT TRACK-     NAME                   │
│ ING NUMBER                               │
│     d003          CCC                    │
│     d005          EEE                    │
│   ◎ THE FOLLOWING REPORTS HAVE           │
│     ALREADY BEEN RECEIVED                │
│     d002          BBB                    │
│     d004          DDD                    │
│     d006          FFF                    │
│                                          │
│       [ DELIVERY COVER SHEET PRINT ]     │
└─────────────────────────────────────────┘
```

REPORT MANAGEMENT SYSTEM AND COMPUTER READABLE MEDIUM

CROSS-REFERENCE TO RELATED APPLICATION

This application is based on and claims priority under 35 USC 119 from Japanese Patent Application No. 2010-184716 filed on Aug. 20, 2010.

BACKGROUND

Technical Field

The present invention relates to report management systems and computer readable medium.

SUMMARY

According to an aspect of the invention, a report management system comprising:

a first receiving unit that receives input of report identification information assigned to each of one or more reports to be collectively delivered to a receiver from a sender;

an assigning unit that assigns group identification information to a group of the one or more reports to be collectively delivered, the group identification information being assigned to identify this group;

a registration unit that register, in a storage unit, the group identification information and each piece of the report identification information, received by the first receiving unit for each report of the group having the group identification information, in such a manner that the group identification information and the report identification information are associated with each other;

an attached document generation unit that generates an attached document that is a document including the group identification information and is to be attached to a report delivered to the receiver from the sender;

a second receiving unit that receives, upon reception of one or more reports by the receiver from the sender together with the attached document, input of the group identification information included in the attached document received by the receiver, and the report identification information of each of the one or more reports received by the receiver together with the attached document; and an output unit that outputs information indicative of a result of comparison made between the report identification information stored in the storage unit in association with the group identification information received by the second receiving unit, and the report identification information received by the second receiving unit.

BRIEF DESCRIPTION OF THE DRAWINGS

Embodiments of the invention will be described in detail based on the following figures.

FIG. 4 is a block diagram illustrating a schematic example of an internal configuration of a management server.

FIG. 5 is a diagram illustrating examples of descriptions of data stored in a report information DB.

FIG. 6 is a diagram illustrating examples of descriptions of operation histories registered in a history information DB.

FIG. 7 is a diagram illustrating examples of numbers of reports which are registered in the history information DB and to be delivered collectively.

FIG. 9 is a diagram illustrating an example of a display screen for receiving input of a report ID that is subject to a delivery operation.

FIG. 10 is a diagram illustrating an example of a display screen for displaying contents of a delivery cover sheet.

FIG. 16 is a diagram illustrating another example of a display screen for displaying contents of a delivery cover sheet.

FIG. 17 is a diagram illustrating another example of a display screen for displaying results of a comparison process.

FIG. 18 is a diagram illustrating an example of a display screen for receiving input of a report ID that is subject to a return operation.

FIG. 19 is a diagram illustrating an example of a display screen for displaying a receipt status of each report.

FIG. 20 is a diagram illustrating an example of a display screen provided when an instruction for registering a history of an operation similar to an operation, a history of which has already been registered, is provided.

FIG. 21 is a diagram illustrating another example of a display screen provided when an instruction for registering a history of an operation similar to an operation, a history of which has already been registered, is provided.

FIG. 22 is a diagram illustrating still another example of a display screen for displaying contents of a delivery cover sheet.

DETAILED DESCRIPTION

Figure 1:
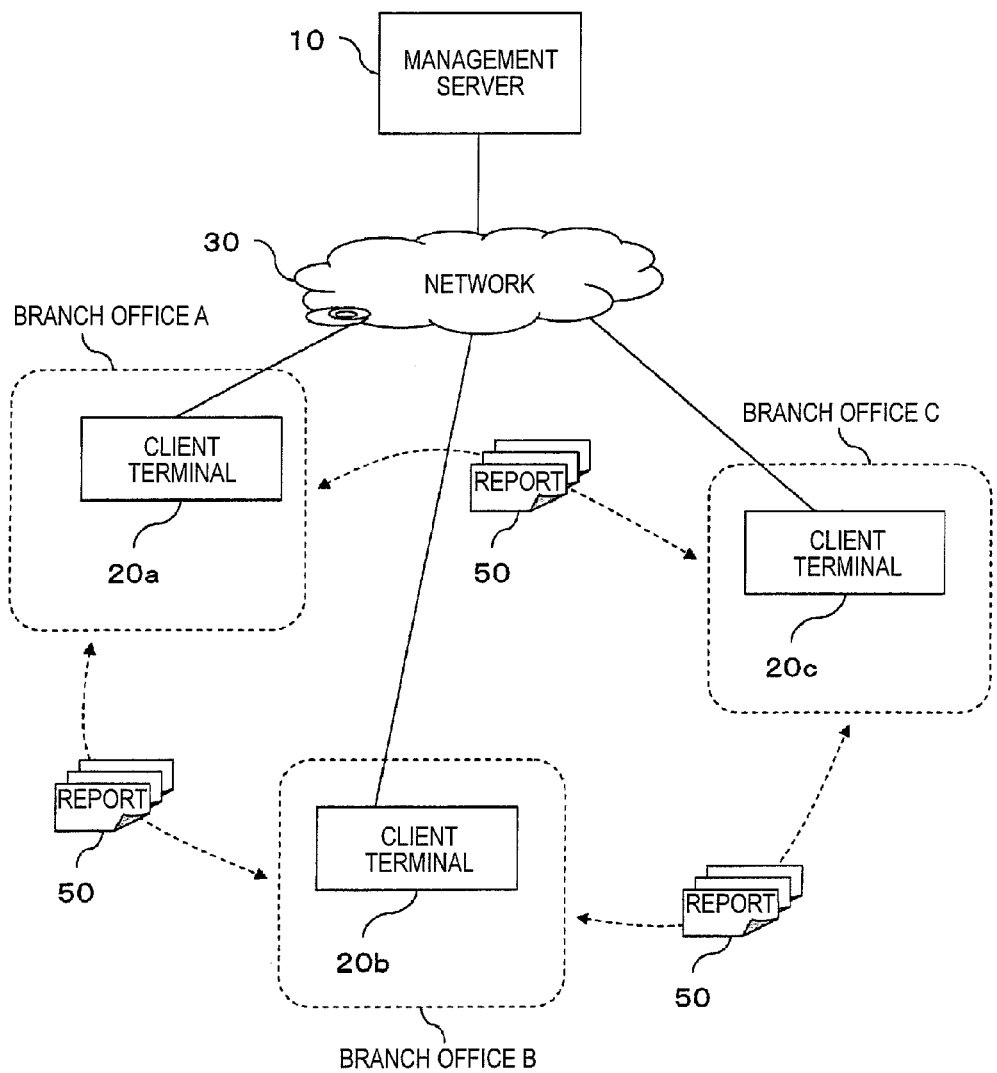
FIG. 1 is a block diagram illustrating a configuration example of a system according to an example of an embodiment of the present invention.

FIG. 1 is a block diagram illustrating a configuration example of a system according to an example of an embodiment of the present invention. The system illustrated in the example of FIG. 1 has the configuration in which a management server 10 and a plurality of client terminals 20a, 20b and 20c (which may hereinafter be generically referred to as a "client terminal 20") are connected to each other via a network 30. For example, the network 30 may be communication means such as the Internet or a LAN (Local Area Network).

The management server 10 is a server apparatus for managing reports 50 exchanged among users of the respective client terminals 20. In the description of the example of the present embodiment, the term "report" refers to a document printed on a medium such as paper. Each client terminal 20 is a terminal apparatus for generating a report, and for transmitting information concerning the report to the management server 10. The respective client terminals 20 may be provided at different locations.

In a specific explanatory example of this embodiment, the client terminals 20a, 20b and 20c are provided in a branch office A, a branch office B and a branch office C, respectively, which are branch offices of a company and established in different areas. In this example, the reports 50 are documents affixed to articles that are transferred among the branch offices A, B and C, and the single report 50 is affixed to the article(s) serving as a unit. Further, on each report 50, a report ID and information related to the article to which this report 50 is affixed are printed.

Note that the three client terminals 20a, 20b and 20c are illustrated in FIG. 1, but the system according to the example of the present embodiment may include less than three client terminals 20 or may include four or more client terminals 20. Furthermore, the mode of installation of each client terminal 20 is not limited to the example of FIG. 1; for example, a plurality of the client terminals 20 may be provided in a building of a single office or branch office. Alternatively, for example, the client terminal 20 may be provided for each department of an organization such as a company or a municipality instead of providing the client terminal 20 for each branch office of a company.

Figure 2:
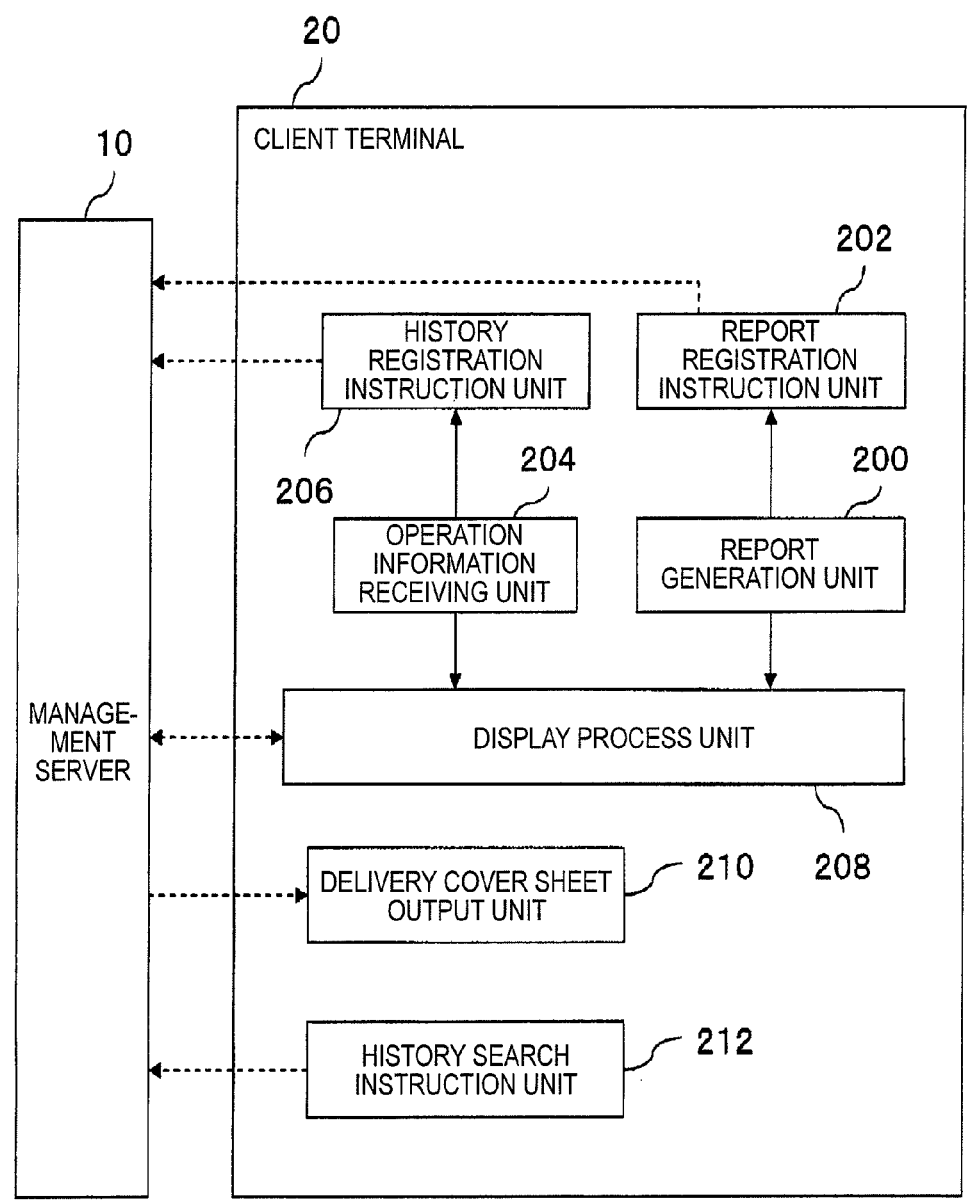
FIG. 2 is a block diagram illustrating a schematic example of an internal configuration of a client terminal.

FIG. 2 schematically illustrates an internal configuration of the client terminal 20. The client terminal 20 includes: a report generation unit 200; a report registration instruction unit 202; an operation information receiving unit 204; a history registration instruction unit 206; a display process unit 208; a delivery cover sheet output unit 210; and a history search instruction unit 212.

The report generation unit 200 performs a process for generating a report. In response to an instruction provided from a user using an input apparatus (not illustrated) such as a mouse or keyboard, for example, the report generation unit 200 creates an electronic document including report contents, and prints this electronic document on a medium such as paper by a printer (not illustrated), thereby generating a report. In this case, the report generation unit 200 assigns a report ID to a report to be generated, and prints the assigned report ID and the above-mentioned electronic document together on the medium. In another example, the report generation unit 200 may assign a report ID to a paper document created in advance, and may print this report ID on the paper document. A report ID is identification information for uniquely identifying a report in the system, and may be decided in accordance with a preset rule. For example, a report ID may be a character string in which information concerning the client terminal 20 (e.g., information on an installation location of the client terminal 20 and/or a MAC address thereof) is combined with information such as a serial number of a report generated within a given period of time in the client terminal 20 and/or a date and time of generation of a report. Furthermore, when a report ID is printed, a character string of the report ID may be printed as it is, or a machine-readable code (such as a bar code) obtained by encoding the report ID may be printed. Alternatively, both of a character string of a report ID and a machine-readable code of the report ID may be printed. Note that the report generation unit 200 is implemented by adding the function of assigning a report ID to a typical software application for creating and/or editing a document, for example.

The report registration instruction unit 202 transmits, to the management server 10, information concerning a report generated by the report generation unit 200, thereby providing an instruction for registering the information concerning the report in the management server 10. For example, the report registration instruction unit 202 at least partially associates a report ID and contents of a report having the report ID with each other, and transmits the resulting information to the management server 10, thereby providing an instruction for registration of the report to the management server 10. In response to this instruction, the management server 10 registers the information concerning this report. In the example of the present embodiment, contents of a report are information concerning an article to which the report is affixed. For example, contents of a report, which are to be printed, include: a name of the article; a name and/or contact information of a client who has made a request for delivery of the article; and a delivery deadline. Contents of a report may be extracted from an electronic document which is generated by the report generation unit 200 and on which the report is based. Alternatively, contents of a report may be extracted from image data obtained by reading the report with a scanner (not illustrated). When contents of a report are extracted from an electronic document or image data, for example, information indicative of a report format may be retained in advance in the client terminal 20, and the report contents may be extracted by making reference to this information. Note that instead of transmitting, to the management server 10, contents extracted from an electronic document or image data, the electronic document or image data itself may be transmitted to the management server 10 together with a report ID. When the electronic document or image data itself is transmitted to the management server 10, the foregoing process for extracting report contents is performed in the management server 10.

The operation information receiving unit 204 receives input of information concerning an operation performed on a report. In the system according to the example of the present embodiment, when an operation of some kind is performed on a report, the user of each client terminal 20 uses an input apparatus of the client terminal 20 to input an instruction for registering a history of this operation in the management server 10. In response to this input, the operation information receiving unit 204 prompts the user to input information indicative of a type of this operation (operation type) and the report ID of the report that is subject to this operation, and receives the input of the operation type and the report ID, which is performed by the user.

When the operation type is inputted, the user may be allowed to select the operation type from among a plurality of operation type candidates. The operation type candidates are set in advance by a manager or the like of the system in accordance with a situation in which a report is utilized, an object of management, etc. In the example of the present embodiment in which a report affixed to an article is processed, a type of work concerning the article to which the report is affixed is set as an operation type. Examples of operation types include article delivery, receipt, content confirmation, and return. An operation type does not necessarily have to be indicative of a type of an operation performed on a report itself as in the example of the present embodiment. However, in another example, a type of an operation performed on a report itself may naturally be set as an operation type. The operation information receiving unit 204 provides an instruction to the display process unit 208, for example, thereby allowing a display device (not illustrated) included in the client terminal 20 to display a display screen for prompting the user to select an operation type. The operation information receiving unit 204 acquires the operation type selected by the user using the input apparatus in accordance with this display screen.

Figure 3:
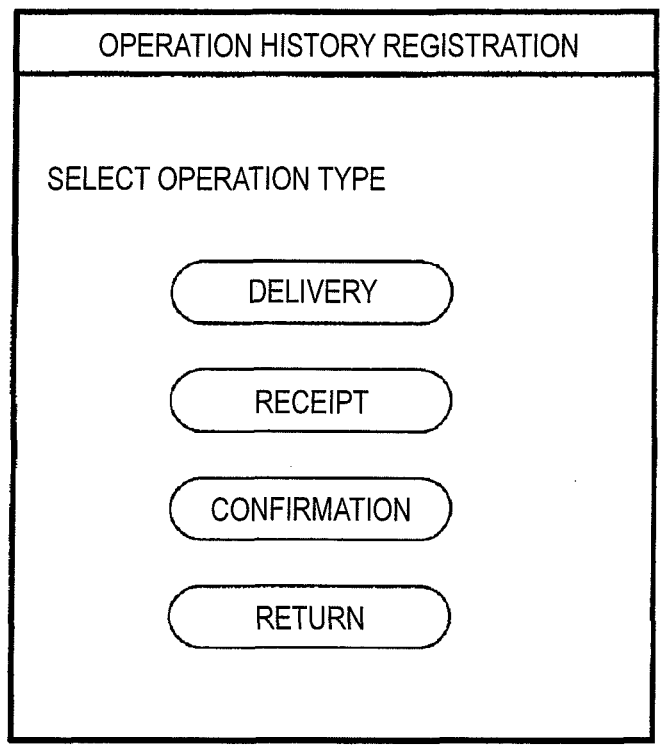
FIG. 3 is a diagram illustrating an example of a display screen for receiving selection of an operation type.

FIG. 3 illustrates an example of a display screen for presenting operation type candidates to the user. The display screen in the example of FIG. 3 provides the following four operation type buttons: "DELIVERY"; "RECEIPT"; "CONFIRMATION"; and "RETURN". Upon designation of the particular operation type button by the user using the input apparatus on the display screen in the example of FIG. 3, the operation information receiving unit 204 acquires the designated operation type. Then, in a mode corresponding to the acquired operation type, input of a report ID of a report that is subject to an operation is received. For example, when the operation type is "DELIVERY", one or more articles to each of which a report is affixed may be collectively delivered at a time, and therefore, input of one or more report IDs is received in that case. Also when the operation type is "RECEIPT" and when the operation type is "RETURN", input of one or more report IDs is received similarly. On the other hand, for example, when the operation type is "CONFIRMATION", contents of articles are confirmed for each unit of the articles, and therefore, input of one report ID is received. Details of an example of reception of input responsive to an operation type will be described later.

Note that a report ID may be inputted manually by the user with the use of a device such as a keyboard or mouse. When a machine-readable code of a report ID is printed on a report, the operation information receiving unit 204 may acquire the report ID by decoding encoded information of the machine-readable code read by a reader. In that case, the reader adaptable to a type of the machine-readable code may be connected to the client terminal 20. For example, when the machine-readable code of a report ID is a bar code, a bar code reader may be connected to the client terminal 20. For the sake of simplification of description, the following description will be made on the assumption that a report ID is manually inputted by the user.

Now, referring again to FIG. 2, the history registration instruction unit 206 provides, to the management server 10, an instruction for registering information, which has been received by the operation information receiving unit 204, as an operation history for the report. For example, a history registration instruction, including the operation type and one or more report IDs received by the operation information receiving unit 204, is transmitted to the management server 10, thus providing an instruction for registering an operation history for each report having the report ID. In addition to an operation type, a history registration instruction may further include information related to the operation to be performed. For example, a history registration instruction may include a user ID serving as identification information for the user who has inputted information received by the operation information receiving unit 204, and/or a date and time (operation date and time) at which input of the operation type for the operation is received by the operation information receiving unit 204. Alternatively, for example, a history registration instruction may further include information concerning an installation location of the client terminal 20 (e.g., information such as a name of a branch office). In the description of the example of the present embodiment, an operation type and other information related to an operation will be referred to as "operation-related information". That is to say, a history registration instruction transmitted from the history registration instruction unit 206 to the management server 10 includes a report ID that is subject to an operation and operation-related information on this operation. Processing performed by the management server 10 that has received a history registration instruction will be described later.

The display process unit 208 performs a process for displaying, on the display device, process results obtained by the respective units of the client terminal 20 and/or information received from the management server 10.

When a report (i.e., an article to which a report is affixed) is "delivered", the delivery cover sheet output unit 210 outputs a delivery cover sheet serving as an attached document attached to the report to be delivered. A single delivery cover sheet is outputted for each delivery, and includes a delivery ID assigned for each delivery. In the example of the present embodiment, "each delivery" means delivery of a group of one or more reports from one branch office to another branch office. A delivery ID is identification information for identifying a group of one or more reports to be delivered collectively by each delivery. In the example of the present embodiment, as will be described later, selection of the operation type "DELIVERY" and input of one or more report IDs are received by the operation information receiving unit 204, and for this input, an instruction for registering an operation history is provided to the management server 10 by the history registration instruction unit 206; then, the management server 10 assigns a delivery ID to a group of the one or more report IDs. The delivery ID is returned to the client terminal 20, and a delivery cover sheet including the delivery ID is outputted by the delivery cover sheet output unit 210. For example, the delivery ID may be printed on a medium such as paper, and may be outputted as a delivery cover sheet. An outputted delivery cover sheet is delivered to a destination branch office so as to be delivered as an attached document, attached to one or more reports corresponding to a delivery ID included in the delivery cover sheet, together with the report(s).

When one or more reports, to which the delivery cover sheet is attached and which have been delivered, are received at the destination branch office, the user of the client terminal 20 at this destination branch office inputs information concerning the "RECEIPT" operation on the one or more reports. For example, on the display screen in the example of FIG. 3, the user selects the "RECEIPT" operation. Upon selection of "RECEIPT", the operation information receiving unit 204 receives not only input of one or more report IDs that are subject to the "RECEIPT" operation but also input of the delivery ID included in the delivery cover sheet attached to the report(s) having the one or more report IDs. The delivery ID and report ID(s) received by the operation information receiving unit 204 are transmitted to the management server 10 by the history registration instruction unit 206. In response to this, the management server 10 performs processing for confirming whether or not the report(s) having the report ID(s) included in a group corresponding to the delivery ID has/have been actually received at the delivery destination together with a history record of the "RECEIPT" operation. The above-mentioned processing performed by the management server 10 will be described later.

The history search instruction unit 212 provides, to the management server 10, an instruction for designating a search criterion and searching for an operation history. Examples of the search criterion include "an operation history for a report having a report ID", "the latest one of operation histories for a report ID", and "the latest one of operation histories for each report included in a group corresponding to a delivery ID". The search criterion may be a criterion inputted by the user. In response to the search instruction provided from the history search instruction unit 212, the management server 10 searches for an operation history. The search result is returned to the client terminal 20 from the management server 10, and is displayed on the display device of the client terminal 20 by the display process unit 208, for example.

FIG. 4 illustrates a schematic example of an internal configuration of the management server 10. The management server 10 includes: a report information DB (database) 100; a report information registration unit 102; a history information DB 104; a history registration unit 106; a delivery ID assigning unit 108; a comparison process unit 110; a history search unit 112; and an output process unit 114.

The report information DB 100 is a database for storing information concerning contents of each report. FIG. 5 illustrates examples of descriptions of data stored in the report information DB 100. In a table illustrated in the example of FIG. 5, values of respective entries of a name, a client and a desired delivery date are registered in association with a report ID of each report. In the example of the present embodiment, the name represents a name of an article to which a corresponding report is affixed. The client represents a name of a client who has made a request for delivery of an article to which a corresponding report is affixed. The desired delivery date represents a delivery date for an article designated by a corresponding client. The values of the respective entries provided in the table in the example of FIG. 5 is information transmitted to the management server 10 by the report registration instruction unit 202 of the foregoing client terminal 20.

Referring again to FIG. 4, in response to an instruction provided from the report registration instruction unit 202 of the client terminal 20, the report information registration unit 102 registers, in the report information DB 100, information concerning contents of each report. For example, when the management server 10 has received report ID(s) and at least part of contents of report(s) having the report ID(s) from the report registration instruction unit 202 of the client terminal 20, the report information registration unit 102 registers, in the report information DB 100, the received report ID(s) and at least part of the received contents of the report(s) in such a manner that the report ID(s) and at least part of the contents are associated with each other.

The history information DB 104 is a database for storing an operation history for each report. FIG. 6 illustrates examples of descriptions of data stored in the history information DB 104. Each row of a table in the example of FIG. 6 represents an information record indicative of a history of a single operation for a single report. Each record in the table of the example of FIG. 6 includes values of respective entries of an operation date and time, an operation type, a report ID, a delivery ID, a user ID, an operation location, and a receipt status. Among those values, the values of the respective entries of an operation date and time, an operation type, a report ID, a user ID and an operation location are included in a history registration instruction transmitted to the management server 10 by the history registration instruction unit 206 of the foregoing client terminal 20. The meaning of each of an operation date and time, an operation type, a report ID and a user ID has already been described above in connection with the history registration instruction unit 206. An operation location represents a location where an operation has been performed on a report. In other words, an operation location represents an installation location of the client terminal 20 that has provided a history registration instruction concerning a corresponding record. For a record in which the operation type is "DELIVERY", the value of the entry of a delivery ID is decided and set by the management server 10. A delivery ID is assigned to a group of one or more report IDs transmitted from the client terminal 20 in association with the operation type "DELIVERY". For example, referring to rows a1, a2 and a3 of the table in the example of FIG. 6, a delivery ID "s001" is assigned to a group of report IDs "d001", "d002" and "d003" for each of which the operation type is "DELIVERY". For the value of a delivery ID in a record in which the value of the operation type indicates an operation type other than "DELIVERY", a delivery ID included in a history registration instruction provided from the client terminal 20 is set. A method for setting the value of a delivery ID when the value of the operation type indicates an operation type other than "DELIVERY" will be described later. Moreover, the value of the entry of a receipt status is decided and set by the management server 10. The value of a receipt status is set in a record in which the operation type is "RECEIPT" and in a record in which the operation type is "RETURN". A method for setting the value of a receipt status will be described later.

Furthermore, in addition to the descriptions of data provided in the example of FIG. 6, the history information DB 104 in the example of the present embodiment also stores descriptions of data provided in a table illustrated in FIG. 7. In the table of the example of FIG. 7, the "NUMBER OF ITEMS" for each delivery ID is registered. The "NUMBER OF ITEMS" represents the number of reports to be collectively delivered by the "DELIVERY" operation for the corresponding delivery ID. In other words, the number of report IDs included in the history registration instruction in which the operation type is "DELIVERY" is defined as the value of the "NUMBER OF ITEMS". In the example of the foregoing delivery ID "s001" illustrated in FIG. 6, the three report IDs "d001", "d002" and "d003" are associated with the delivery ID "s001", and therefore, the number of items corresponding to the delivery ID "s001" is "3" in the table of the example of FIG. 7.

Referring again to FIG. 4, the history registration unit 106 registers information in the history information DB 104. For example, the history registration unit 106 receives values of the respective entries of the table in the example of FIG. 6 from the history registration instruction unit 206 of the client terminal 20, and performs a process for registering the received values in the respective entries of the history information DB 104. Further, the history registration unit 106 includes a registration requirement determining unit 1060. The registration requirement determining unit 1060 determines whether or not information included in a history registration instruction received from the client terminal 20 satisfies a preset registration requirement. Upon determination that the registration requirement is satisfied, the history registration unit 106 registers the received information in the history information DB 104, and upon determination that the registration requirement is not satisfied, the history registration unit 106 transmits information indicative of this determination result to the client terminal 20 via the after-mentioned output process unit 114. The registration requirement is a requirement for determining whether or not a history registration instruction received from the client terminal 20 indicates a proper operation history. For example, the registration requirement may be a requirement set based on a relationship between: report ID(s) and operation-related information included in a history registration instruction; and a history that has already been registered in the history information DB 104. One specific example of the registration requirement is that "in operation histories that have already been registered in the history information DB 104, there exists no operation history having a combination of a report ID, an operation type, a user ID and an operation location identical to that of a report ID, an operation type, a user ID and an operation location for which a history registration instruction is provided". When a history registration instruction, including a combination of a report ID, an operation type, a user ID and an operation location identical to that of a report ID, an operation type, a user ID and an operation location which have already been registered in the history information DB 104, is received from the client terminal 20, the registration requirement of the above-mentioned example is not satisfied. When this registration requirement is not satisfied, the operation history, for which a registration instruction is provided by the client terminal 20, overlaps with the operation history that has already been registered, and therefore, the client terminal 20 is notified of this fact.

Moreover, when the operation type included in a history registration instruction is "DELIVERY", the history registration unit 106 in the example of the present embodiment issues a request to the delivery ID assigning unit 108 to assign a delivery ID to a group of one or more report IDs included in the history registration instruction together with the operation type "DELIVERY". The delivery ID assigning unit 108, which has received the request from the history registration unit 106, generates a delivery ID that does not overlap with a delivery ID that has already been registered in the history information DB 104, and assigns the generated delivery ID as the delivery ID corresponding to the group of the report Ms. The assigned delivery ID is transmitted to the client terminal 20 via the output process unit 114. The history registration unit 106 sets the value of the assigned delivery ID in the entry of the delivery ID in a record in the history information DB 104 for each report ID included in the history registration instruction (see FIG. 6), and in association with this delivery ID, the history registration unit 106 registers, in the history information DB 104, the number of the report IDs included in the history registration instruction (see FIG. 7).

Further, when the operation type included in the history registration instruction is "RECEIPT", the history registration unit 106 issues a request to the comparison process unit 110 to confirm whether or not a report, which has been registered as a target for the "DELIVERY" operation corresponding to this "RECEIPT" operation, has been actually received. When the operation type included in the history registration instruction is "RECEIPT", the history registration instruction transmitted to the management server 10 from the client terminal 20 includes a delivery ID and one or more report IDs. The comparison process unit 110 reads, from the history information DB 104, one or more report IDs associated with the delivery ID received from the client terminal 20, and compares the read one or more report IDs with the one or more report IDs received from the client terminal 20 together with the delivery ID. That is to say, the report ID, which is included in both of the one or more report IDs read from the history information DB 104 and the one or more report IDs received from the client terminal 20, is the report ID of a report that has been registered as a target for the "DELIVERY" operation and has been actually "RECEIVED". However, the report ID, which is included in the one or more report IDs read from the history information DB 104 but is not included in the one or more report IDs received from the client terminal 20, is the report ID of a report that has not been actually "RECEIVED" although this report has been registered as a target for the "DELIVERY" operation. To the contrary, the report ID, which is not included in the one or more report IDs read from the history information DB 104 but is included in the one or more report IDs received from the client terminal 20, is the report ID of a report that has been "RECEIVED" together with the delivery cover sheet including the delivery ID for the "DELIVERY" operation although this report is not a target for the "DELIVERY" operation.

The comparison process unit 110 transmits information indicative of a result of the above-described comparison to the client terminal 20 via the output process unit 114. The comparison process unit 110 further notifies the history registration unit 106 of the comparison result, and the history registration unit 106 sets a value indicative of the notified comparison result in the entry of the receipt status in a record in the history information DB 104 for each report ID included in the history registration instruction. Referring to the table in the example of FIG. 6, the value "RECEIVED" in the entry of "RECEIPT STATUS" in a history of a "RECEIPT" operation indicates, as a result of the comparison process, that the corresponding report ID is included in both of the one or more report IDs read from the history information DB 104 and the one or more report IDs received from the client terminal 20. On the other hand, "NOT RECEIVED" indicates that the corresponding report ID is included in the one or more report IDs read from the history information DB 104 but is not included in the one or more report IDs received from the client terminal 20. "NOT INCLUDED IN LIST" indicates that the corresponding report ID is not included in the one or more report IDs read from the history information DB 104 but is included in the one or more report IDs received from the client terminal 20.

The history search unit 112 searches the history information DB 104 for an operation history that meets the designated search criterion. For example, upon reception of a search instruction, including the search criterion, from the history search instruction unit 212 of the client terminal 20, the history search unit 112 searches the history information DB 104 for an operation history in accordance with the search criterion included in this search instruction. A result of the search, performed in response to the search instruction provided from the client terminal 20, is returned to the client terminal 20 via the output process unit 114.

The output process unit 114 outputs a process result obtained by each unit of the above-described management server 10. For example, upon determination by the registration requirement determining unit 1060 of the history registration unit 106 that the registration requirement is not satisfied, the output process unit 114 transmits information indicative of this determination to the client terminal 20. Further, for example, the output process unit 114 may transmit, to the client terminal 20, a delivery ID decided by the delivery ID assigning unit 108 and a process result obtained by the comparison process unit 110. Moreover, the output process unit 114 may transmit, to the client terminal 20, a result of a search made on the history information DB 104 by the history search unit 112 in response to a history search instruction from the client terminal 20. When information is transmitted to the client terminal 20, the output process unit 114 generates, for example, display control information for controlling a mode of displaying the information, which is to be transmitted, on the display device of the client terminal 20, and transmits the generated display control information to the client terminal 20.

Thus far, the configuration example of the system according to the example of the present embodiment has been described. Hereinafter, examples of operations of this system will be described.

<Registration of History of "DELIVERY" Operation">

First, an example of a procedure for processing performed by each of the client terminal 20 and the management server 10 at the time of operation history registration will be described based on an example in which report(s) is/are delivered.

Figure 8:
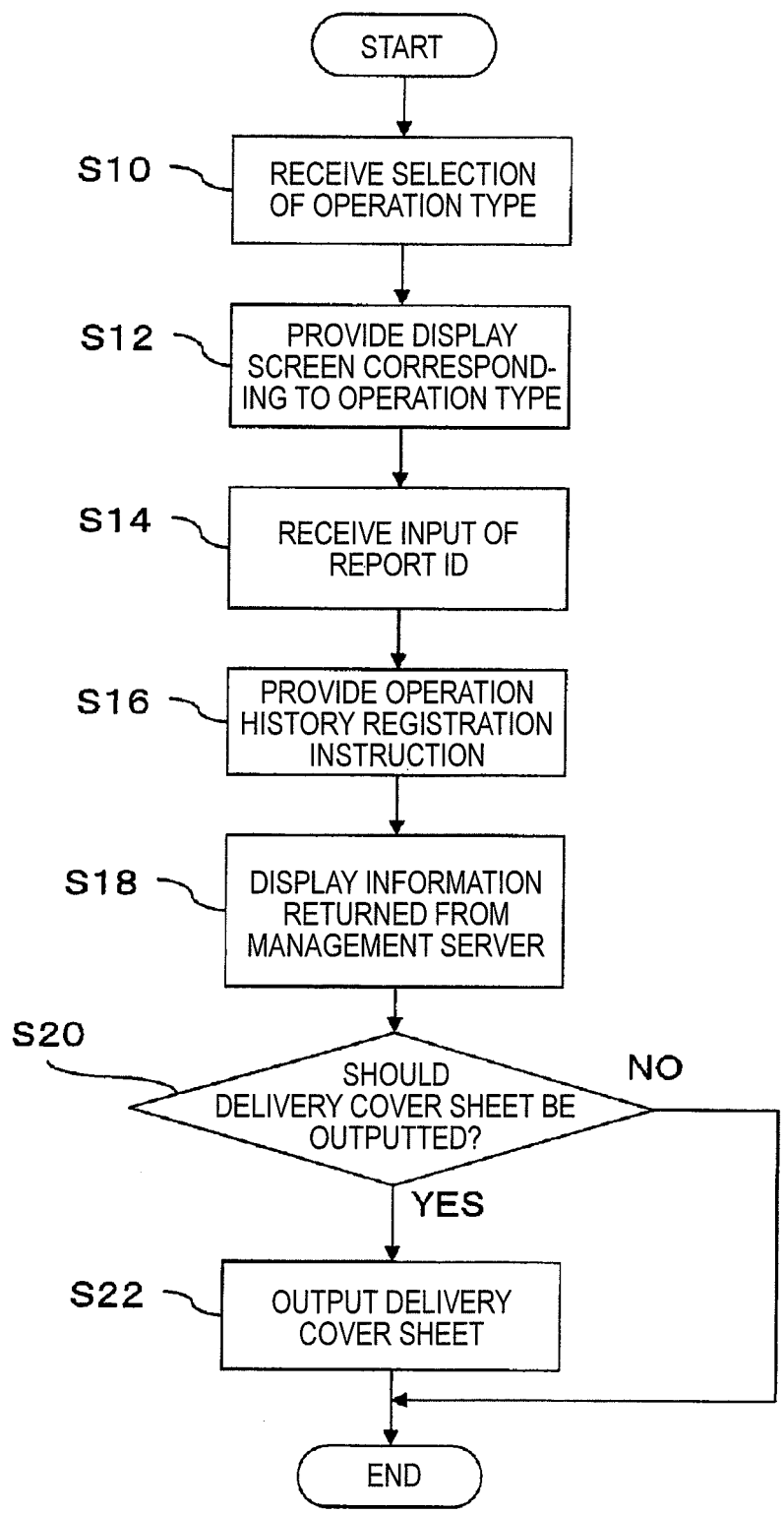
FIG. 8 is a flow chart illustrating an example of a procedure for processing performed by the client terminal.

FIG. 8 is a flow chart illustrating an example of a procedure for processing performed by the client terminal 20 at the time of operation history registration. For example, when an input indicative of a desire for operation history registration is made by a user, the operation information receiving unit 204 of the client terminal 20 starts the processing in accordance with the procedure illustrated in the example of FIG. 8.

Referring to FIG. 8, the operation information receiving unit 204 receives selection of an operation type made by the user (Step S10). For example, the operation information receiving unit 204 issues a request to the display process unit 208 to allow the display screen such as one illustrated in FIG. 3 to be provided on the display device, thereby prompting the user to select an operation type. In this embodiment, the user who has confirmed the display screen of FIG. 3 uses the input apparatus to select "DELIVERY", and the operation information receiving unit 204 receives this selection.

Upon reception of selection of the operation type, the operation information receiving unit 204 issues a request to the display process unit 208 to allow a display screen corresponding to the selected operation type to be provided on the display device (Step S12). The display screen provided in Step S12 displays information for prompting the user to input report ID(s) of report(s) that is/are subject to an operation. When there is information, which has to be inputted by the user in accordance with the operation type, in addition to the report ID(s), the display screen provided in Step S12 also displays information for prompting the user to input this additional information. In this embodiment, a display screen illustrated in an example of FIG. 9 will be provided in Step S12. The display screen in the example of FIG. 9 includes: a region r1 in which report ID(s) is/are inputted; and a "REGISTRATION" button. In the example of FIG. 9 and examples of various display screens described later, "REPORT TRACKING NUMBER" means report ID(s). The user inputs report ID(s) in the region r1 by using the input apparatus such as a keyboard, for example.

After Step S12, the operation information receiving unit 204 receives the report ID(s) inputted by the user (Step S14). In the example of the present embodiment in which a history of a "DELIVERY" operation is registered, only one report ID may be received, or a plurality of report IDs may be received. When the display screen in the example of FIG. 9 is provided in Step S12, the operation information receiving unit 204 acquires report IDs inputted in the region r1. FIG. 9 illustrates the example in which the report IDs "d001", "d002" and "d003" are inputted. In the example of FIG. 9, reports of these three report IDs are collectively delivered to a delivery destination.

When the user has given an instruction for execution of registration after the input of the report ID(s), the history registration instruction unit 206 provides an instruction for operation history registration to the management server 10 (Step S16). For example, upon pressing of the "REGISTRATION" button on the display screen in the example of FIG. 9 by the user, the operation information receiving unit 204 passes the information, received in Steps S10 and S14, to the history registration instruction unit 206. The history registration instruction unit 206 generates a history registration instruction including the information received from the operation information receiving unit 204, and transmits the generated history registration instruction to the management server 10. The history registration instruction includes: the operation type selected in Step S10; and the report ID(s) inputted in Step S14. In addition to the operation type and report ID(s), the history registration instruction generated by the history registration instruction unit 206 in the example of the present embodiment further includes: a current date and time (operation date and time); a user ID of the user who has made inputs in Steps S10 and S14; and information indicative of an installation location of the client terminal 20. The current date and time is registered as "OPERATION DATE AND TIME" in the history information DB 104 of the management server 10. For example, the user ID of the user who has made inputs may be a user ID obtained by performing a user authentication process before the start of the processing of the procedure illustrated in the example of FIG. 8 in the client terminal 20, and the user ID obtained as a result of this user authentication process may be included in the history registration instruction. Information indicative of the installation location of the client terminal 20 (e.g., a name of a branch office) may be stored in advance in an unillustrated storage device of the client terminal 20 so that this information is read from this storage device and included in the history registration instruction. Note that in the example of the present embodiment, the history registration instruction including the operation type "DELIVERY", the report IDs "d001", "d002" and "d003", the date and time "2010.6.3. 10:05:40", the user ID "user X", and the operation location "BRANCH OFFICE A" is transmitted to the management server 10 in Step S16.

In response to the history registration instruction provided in Step S16, the management server 10 performs operation history registration. Details of the rows a1 to a3 in FIG. 6, illustrating examples of descriptions of data stored in the history information DB 104, provide examples of operation histories registered in the example of the present embodiment. Further, for the "DELIVERY" operation in the example of the present embodiment, the delivery ID "s001" is assigned by the delivery ID assigning unit 108 of the management server 10 and is returned to the client terminal 20. An example of a procedure for specific processing performed by the management server 10 will be described later.

The display process unit 208 of the client terminal 20 displays, on the display device, the information returned from the management server 10 in response to the history registration instruction provided from the history registration instruction unit 206 (Step S18). In the example of the present embodiment, the delivery ID "s001", and a name corresponding to each report ID that is subject to the "DELIVERY" operation (i.e., information registered in the report information DB 100 of the management server 10) are returned from the management server 10. In Step S18 in the example of the present embodiment, a display screen illustrated in FIG. 10, for example, is provided. For "DELIVERY LIST REGISTRATION NUMBER" that suggests a delivery ID, the delivery ID "s001" returned from the management server 10 is displayed on the display screen in the example of FIG. 10. Moreover, names "AAA", "BBB" and "CCC" of respective reports, returned from the management server 10, are displayed in association with respective numbers in "TRACKING NUMBER" (i.e., respective report IDs). In the example of the present embodiment, the information displayed on the display screen in the example of FIG. 10 is used as contents of a delivery cover sheet attached to reports that are subject to the "DELIVERY" operation. A "DELIVERY COVER SHEET PRINT" button on the display screen in the example of FIG. 10 functions as a button through which the user provides an instruction for printing a delivery cover sheet.

After Step S18, the delivery cover sheet output unit 210 of the client terminal 20 decides whether or not a delivery cover sheet should be outputted (Step S20). This decision may be made in accordance with whether or not the delivery ID has been returned from the management server 10. For example, when the delivery ID has been returned from the management server 10, the delivery cover sheet output unit 210 decides to output a delivery cover sheet, but when no delivery ID has been returned from the management server 10, the delivery cover sheet output unit 210 decides not to output a delivery cover sheet. When the operation type is not "DELIVERY", no delivery ID will be returned, and therefore, no delivery cover sheet will be outputted. Note that in the example of the present embodiment, the delivery cover sheet output unit 210 decides to output a delivery cover sheet in Step S20 when the delivery ID has been returned and the user has pressed the "DELIVERY COVER SHEET PRINT" button on the display screen in the example of FIG. 10.

When a delivery cover sheet is outputted (i.e., when the answer is YES in Step S20), the delivery cover sheet output unit 210 outputs a delivery cover sheet including the delivery ID returned from the management server 10 (Step S22). In the example of the present embodiment, as illustrated in the display screen in the example of FIG. 10, the delivery cover sheet output unit 210 outputs the delivery cover sheet including, in addition to the delivery ID, the report IDs and the names of the reports having the respective report IDs.

After Step S22 or when no delivery cover sheet is outputted (i.e., when the answer is NO in Step S20), the processing of the procedure in the example of FIG. 8 ends.

Thus far, the example of the procedure for the processing performed by the client terminal 20 at the time of "DELIVERY" operation history registration has been described. Hereinafter, referring to FIG. 11, an example of a procedure for processing performed by the management server 10 that has received a history registration instruction from the client terminal 20 will be described. Upon reception of the history registration instruction transmitted from the client terminal 20 in Step S16 in the example of FIG. 8, the management server 10 starts the processing in accordance with the procedure illustrated in the example of FIG. 11.

The history registration unit 106 of the management server 10 identifies the operation type included in the history registration instruction received from the client terminal 20 (Step S30). In the example of the present embodiment, since the history registration instruction includes the operation type "DELIVERY", the history registration unit 106 identifies the operation type as "DELIVERY".

Then, the registration requirement determining unit 1060 of the history registration unit 106 determines whether or not the information included in the history registration instruction satisfies the registration requirement (Step S32). Details on an example of this determination process will be described later. When the registration requirement is satisfied (i.e., when the answer is YES in Step S32), the procedure proceeds to Step S34, but when the registration requirement is not satisfied (i.e., when the answer is NO in Step S32), the procedure proceeds to Step S46. In Step S46, a process for confirming a decision made by the user of the client terminal 20 on whether to allow history registration is performed. When an instruction for registration is provided as a result of this confirmation process (i.e., when the answer is YES in Step S48), the procedure proceeds to Step S34, but when an instruction for registration is not provided as a result of this confirmation process (i.e., when the answer is NO in Step S48), the processing of the procedure in the example of FIG. 11 ends. Specific examples of the processes in Steps S46 and S48 will be described later. In the example of the present embodiment, the description is made on the assumption that the registration requirement is determined to be satisfied by the determination process in Step S32, and the procedure proceeds to Step S34.

In Step S34, the history registration unit 106 determines whether or not the operation type identified in Step S30 is "DELIVERY". In the example of the present embodiment in which the operation type is "DELIVERY", the result of the determination in Step S34 is YES, and the history registration unit 106 issues a request to the delivery ID assigning unit 108 to assign a delivery ID associated with the "DELIVERY" operation (Step S36). In this step, the delivery ID "s001" is assigned. Upon assignment of the delivery ID by the delivery ID assigning unit 108, the history registration unit 106 transmits this delivery ID to the client terminal 20 that has provided the history registration instruction (Step S38). In this step, the history registration unit 106 in the example of the present embodiment transmits not only the delivery ID but also contents provided in the delivery cover sheet. For example, report ID(s) of report(s) to be delivered (i.e., report ID(s) included in the history registration instruction) and at least part of report information (e.g., information in "NAME" in the table of the example of FIG. 5) stored in the report information DB 100 in association with each report ID are transmitted to the client terminal 20. The information transmitted by the history registration unit 106 in Step S38 is displayed on the display device of the client terminal 20 in Step S18 in FIG. 8.

After Step S38, the history registration unit 106 registers a history of the "DELIVERY" operation in the history information DB 104 (Step S44). In Step S44, the history registration unit 106 generates a new information record in the history information DB 104 for each report ID included in the history registration instruction received from the client terminal 20, and sets a value of each entry of this information record to a value included in the history registration instruction. In the example of the present embodiment, on the assumption that each information record in the history information DB 104 includes the entries illustrated in FIG. 6, the history registration unit 106 generates information records (i.e., the rows a1, a2 and a3 in FIG. 6) corresponding to the report IDs "d001", "d002" and "d003" included in the history registration instruction; then, for the respective entries of these information records, the history registration unit 106 sets values of respective entries included in the history registration instruction (i.e., the operation date and time "2010.6.3. 10:05:40", the operation type "DELIVERY", the user ID "user X", and the operation location "BRANCH OFFICE A"). Moreover, in the entry of "DELIVERY ID" in each of these information records, the value "s001" of the delivery ID assigned in Step S36 is set. Besides, the history registration unit 106 registers the number ("3") of the report IDs, included in the history registration instruction, in the history information DB 104 in association with the delivery ID "s001" (see FIG. 7). After Step S44, the processing of the procedure in the example of FIG. 11 ends.

Note that when the operation type is not "DELIVERY" in Step S34, the result of the determination is NO, and the processing proceeds to Step S40 to determine whether or not the operation type is "RECEIPT". When the operation type is "RECEIPT" (i.e., when the answer is YES in Step S40), the comparison process unit 110 performs a comparison process (Step S42), and then a history of the "RECEIPT" operation is registered in the history information DB 104 (Step S44). When the operation type is not "RECEIPT" (i.e., when the answer is NO in Step S40), the comparison process (Step S42) is skipped, and operation history registration is performed (Step S44). Specific exemplary processing performed in Step S40 and the subsequent steps when the operation type is not "DELIVERY" will be described later.

Thus far, the example of the processing performed by each of the client terminal 20 and the management server 10 when a history of the "DELIVERY" operation is registered in the management server 10 has been described with reference to FIGS. 8 to 11. As a result of performing the above-described exemplary processing, the delivery ID (s001) is assigned to a group of the report IDs ("d001", "d002" and "d003") of reports to be collectively delivered, and this delivery ID and the respective report IDs are registered in the history information DB 104 of the management server 10 so as to be associated with each other. Besides, a delivery cover sheet including this delivery ID is created. This delivery cover sheet is attached to report(s) included in a group corresponding to this delivery ID, and is delivered to a delivery destination.

<Registration of History of "RECEIPT" Operation">

After the "DELIVERY" operation history registration described above, the delivery cover sheet including the corresponding delivery ID is attached to one or more reports to be delivered, and the one or more reports are delivered to a delivery destination. The user who has received the report(s) and the delivery cover sheet uses the client terminal 20 to provide, to the management server 10, an instruction for registering a history of a "RECEIPT" operation concerning the received report(s). As one specific example, the following description will be made on the assumption that the reports having the report IDs "d001", "d002" and "d003" and the delivery cover sheet including the delivery ID "s001" are delivered to the branch office B by the user "user X" in the branch office A, and the user "user Y" in the branch office B, who has received these reports and delivery cover sheet, provides an instruction for registering a history of a "RECEIPT" operation. Further, the following description will be made on the assumption that at the time when an instruction for registering a history of a "RECEIPT" operation is provided, descriptions of data provided in the rows a1, a2 and a3 in the example of FIG. 6 are already registered in the history information DB 104 of the management server 10.

Note that a basic procedure of processing performed by each of the client terminal 20 and the management server 10 in registering a history of a "RECEIPT" operation may be similar to that of the processing performed by each of the client terminal 20 and the management server 10 in registering a history of the "DELIVERY" operation, which has been described with reference to FIGS. 8 to 11.

The user "user Y" in the branch office B uses an input apparatus of the client terminal 20b in the branch office B to make an input indicative of a desire for operation history registration. In response to this input, the client terminal 20b starts the processing of the procedure illustrated in the example of FIG. 8.

Figure 12:
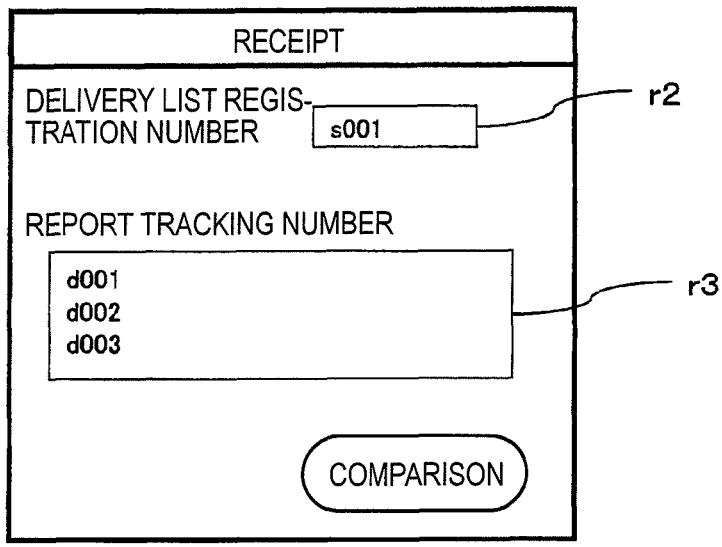
FIG. 12 is a diagram illustrating an example of a display screen for receiving input of a report ID that is subject to a receipt operation.

In the example of the present embodiment, in Step S10 of FIG. 8, "RECEIPT" is selected on the display screen (see FIG. 3) for receiving selection of the operation type. In Step S12, the display device displays, as a display screen corresponding to the "RECEIPT" operation, a display screen for receiving input of the delivery ID included in the delivery cover sheet, and the report ID(s) of the report(s) received together with this delivery cover sheet. An example of this display screen is illustrated in FIG. 12. On the display screen in the example of FIG. 12, a region r2 is an input box for a delivery ID, and a region r3 is an input box for report ID(s). Further, a "COMPARISON" button on the display screen in the example of FIG. 12 functions as a button for receiving an instruction for execution of a comparison process for confirming whether or not the report(s) included in a group corresponding to the delivery ID of the received delivery cover sheet is/are identical to the received report(s). The user "user Y" who has confirmed the display screen in the example of FIG. 12 uses the input apparatus to input the delivery ID "s001" in the region r2 for "DELIVERY LIST REGISTRATION NUMBER" and to input the report IDs "d001", "d002" and "d003" for "REPORT TRACKING NUMBER", and presses the "COMPARISON" button (Step S14). When the operation information receiving unit 204 has received the inputs made in Step S14, the history registration instruction unit 206 provides, to the management server 10, a history registration instruction including the operation type "RECEIPT", the report IDs "d001", "d002" and "d003" and the delivery ID "s001" (Step S16). Note that the history registration instruction in the example of the present embodiment further includes an operation date and time "2010.6.4. 12:55:31", the user ID "user Y" and the operation location "BRANCH OFFICE B".

Figure 11:
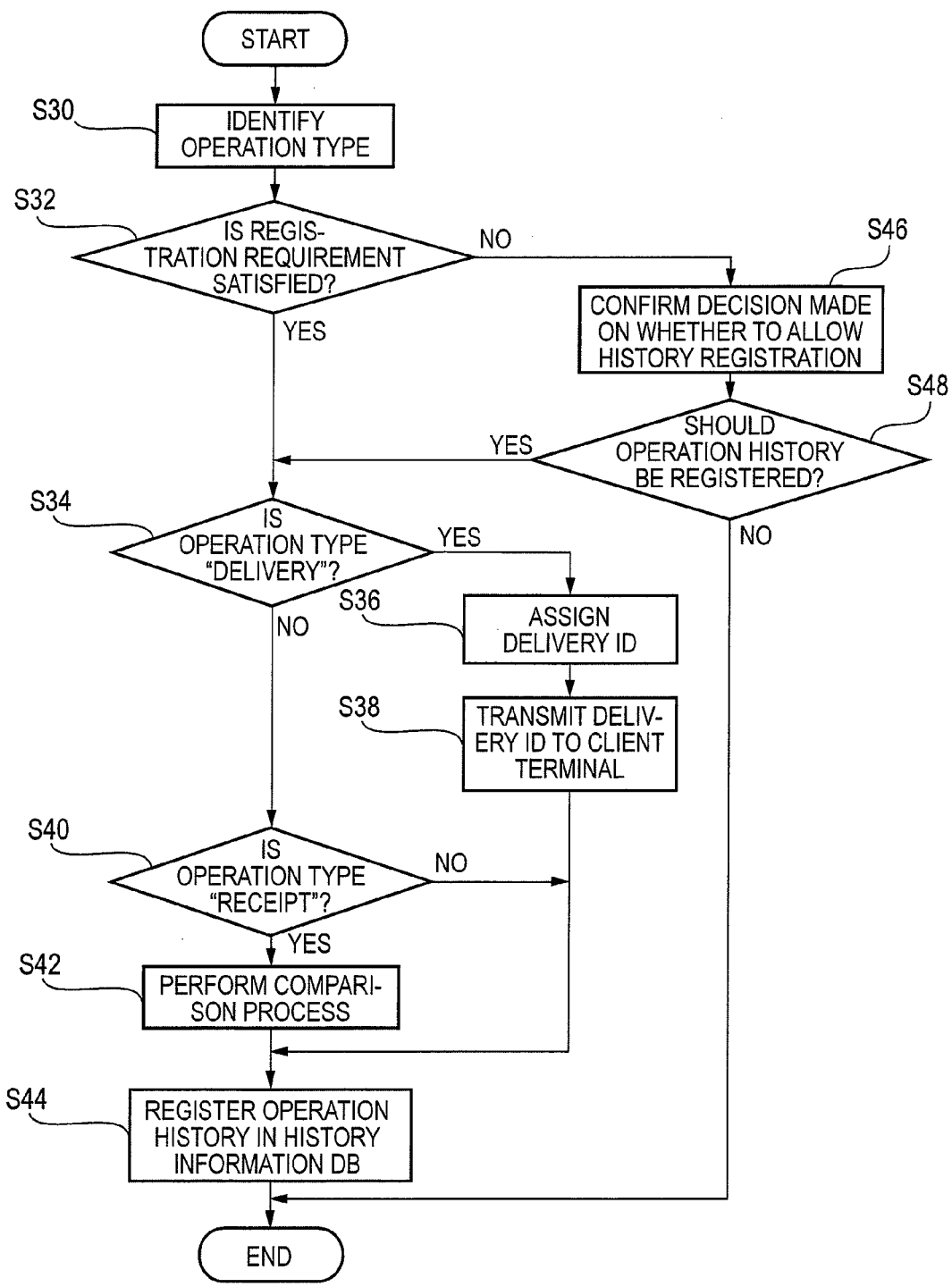
FIG. 11 is a flow chart illustrating an example of a procedure for processing performed by the management server.

Upon reception of the history registration instruction provided by the client terminal 20b in Step S16, the management server 10 performs a comparison process on the report IDs and a "RECEIPT" operation history registration process in accordance with the procedure illustrated in the example of FIG. 11. First, the history registration unit 106 of the management server 10 identifies the operation type, included in the history registration instruction, as "RECEIPT" in Step S30 of FIG. 11, and determines whether or not the registration requirement is satisfied in Step S32. In the example of the present embodiment, it is determined in Step S32 that the registration requirement is satisfied, and the procedure proceeds to Step S34. Since the operation type identified in Step S30 is not "DELIVERY", the result of the determination in Step S34 is NO, so that the procedure proceeds to Step S40. Since the operation type is "RECEIPT", the result of the determination in Step S40 is YES, so that a comparison process (Step S42) is performed by the comparison process unit 110.

Figure 13:
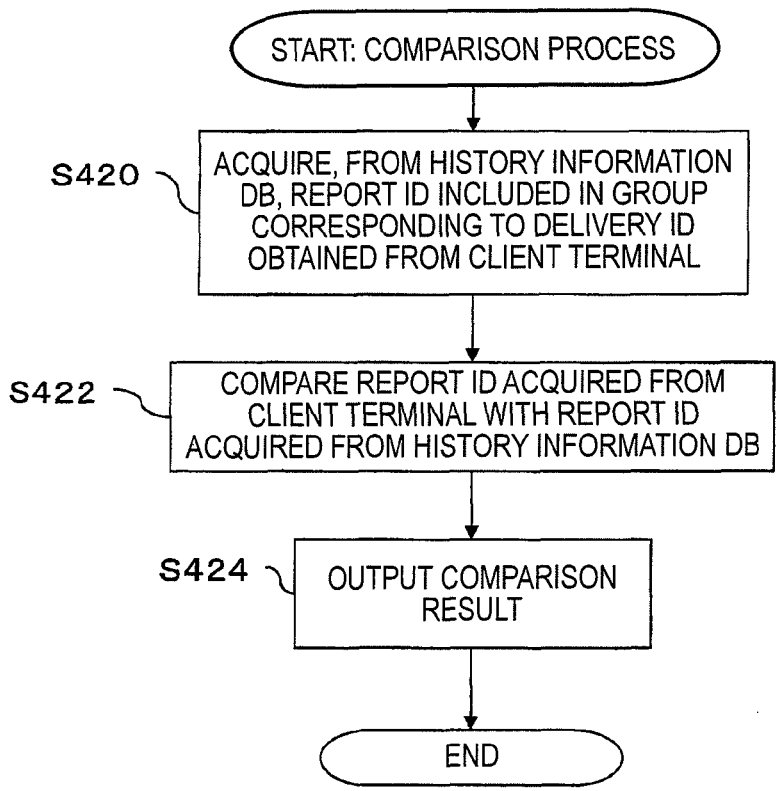
FIG. 13 is a flow chart illustrating an example of a detailed procedure for a comparison process.

FIG. 13 illustrates an example of a detailed procedure of the comparison process (Step S42 of FIG. 11). Upon start of Step S42 of FIG. 11, the comparison process unit 110 starts the procedure in the example of FIG. 13. First, the comparison process unit 110 acquires, from the history information DB 104, the report ID(s) included in a group corresponding to the delivery ID obtained from the client terminal 20 (Step S420). In the history information DB 104, the report ID(s) included in a group corresponding to the delivery ID is/are the report ID(s) in record(s) in which the value of this delivery ID is included and the operation type is "DELIVERY". In the example of the present embodiment, the delivery ID included in the history registration instruction provided from the client terminal 20b is "s001", and descriptions of data in the rows a1 to a3 in the example of FIG. 6 are registered in the history information DB 104. Therefore, in Step S420, the report IDs "d001", "d002" and "d003" of the three records each including the delivery ID "s001" and the operation type "DELIVERY" are acquired from the history information DB 104.

Subsequently, the comparison process unit 110 compares the report IDs acquired from the client terminal 20 with the report IDs acquired from the history information DB 104 (Step S422). In the example of the present embodiment, the report IDs included in the history registration instruction provided from the client terminal 20 are "d001", "d002" and "d003". These report IDs are identical to the report IDs acquired from the history information DB 104 in Step S420. That is to say, in the example of the present embodiment, all reports having the report IDs concerning the "DELIVERY" operation are actually "RECEIVED" at a delivery destination.

The comparison process unit 110 transmits information, indicative of a result of the comparison made on the report IDs in Step S422, to the client terminal 20 via the output process unit 114 (Step S424). In this step, the comparison process unit 110 transmits information indicating that the report IDs "d001", "d002" and "d003" acquired from the client terminal 20 are identical to the report IDs acquired from the history information DB 104 as the report IDs included in a group corresponding to the delivery ID "s001". After Step S424, the process of the procedure in the example of FIG. 13 ends in the management server 10, and the processing proceeds to Step S44 in the example of FIG. 11.

Figure 14:
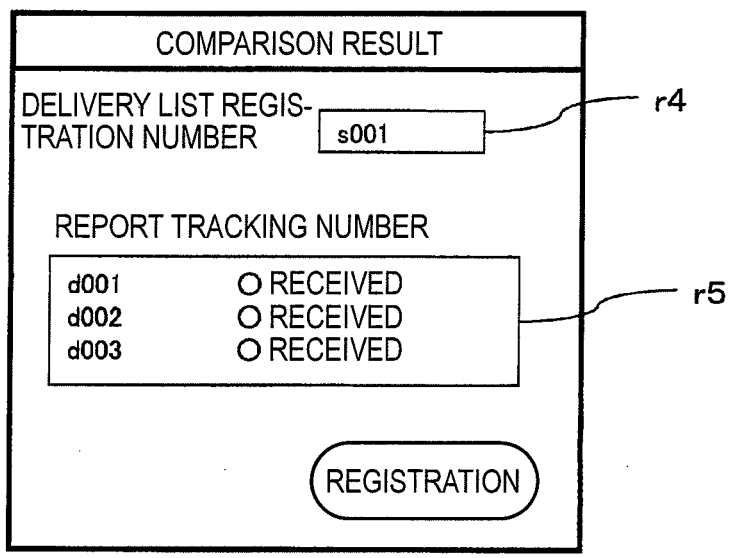
FIG. 14 is a diagram illustrating an example of a display screen for displaying results of a comparison process.

Note that the information transmitted from the management server 10 in Step S424 is displayed on a display screen such as one illustrated in FIG. 14, for example, on the display device of the client terminal 20 (Step S18 of FIG. 8). On the display screen in the example of FIG. 14, the delivery ID "s001" inputted in Step S14 of FIG. 8 is displayed in a region r4 for "DELIVERY LIST REGISTRATION NUMBER". Furthermore, in a region r5, a message saying that "O RECEIVED" is displayed for each of the report IDs "d001", "d002" and "d003". In this case, "O RECEIVED" is a preset message to be displayed on the client terminal 20 upon determination that the report IDs acquired from the client terminal 20 and the report IDs acquired from the history information DB 104 are identical to each other as a result of the comparison made in the management server 10 in Step S422 of FIG. 13. The display screen in the example of FIG. 14 indicates that all the reports, which correspond to the delivery ID "s001" and should be delivered by the single "DELIVERY" operation, have been actually "RECEIVED". The user who has confirmed the display screen in the example of FIG. 14 presses a "REGISTRATION" button on the display screen in the example of FIG. 14, and information indicating that the "REGISTRATION" button has been pressed is transmitted to the management server 10 from the client terminal 20. In response to this, the history registration unit 106 of the management server 10 registers a history of this "RECEIPT" operation in the history information DB 104 (Step S44 of FIG. 11).

In the example of the present embodiment, in Step S44 of FIG. 11, the history registration unit 106 generates, in the history information DB 104, new records corresponding to the respective report IDs "d001", "d002" and "d003" included in the history registration instruction for the "RECEIPT" operation, and registers, in respective entries of these records, the values of respective entries included in the history registration instruction (see rows b1, b2 and b3 in FIG. 6). In the entry of the delivery ID of each of these records, the history registration unit 106 sets the value "s001" of the delivery ID, which is included in the delivery cover sheet received together with the reports and which is included in the history registration instruction. Further, in the entry of "RECEIPT STATUS" of each of these records, the value indicative of a result of the comparison made in Step S422 of FIG. 13 is registered. In the example of the present embodiment in which reference is made to the rows b1, b2 and b3 in FIG. 6, as the value of the entry of the receipt status for each of the report IDs "d001", "d002" and "d003", the history registration unit 106 registers "RECEIVED" indicating that the report IDs acquired from the client terminal 20 are identical to the report IDs included in a group corresponding to the delivery ID.

<Registration of History of "CONFIRMATION" Operation>

In the example of the present embodiment, an operation for confirming contents of a "RECEIVED" report may be performed. For example, the user who has received a report may confirm contents of the report, and may judge whether or not the contents should be approved. In the example of this system that handles a report affixed to an article to be delivered, the user confirms whether or not contents of an article to which a report is affixed matches with the contents of the report. A history of the above-mentioned "CONFIRMATION" operation may also be registered in the history information DB 104 of the management server 10. The following description will be made on exemplary processing performed by the client terminal 20 and the management server 10 when the user confirms contents of reports (i.e., the report IDs "d001", "d002" and "d003") received in the branch office B in the foregoing example of registration of a history of the "RECEIPT" operation, and then registers a history of this "CONFIRMATION" operation. At the time when an instruction for registration of a history of this "CONFIRMATION" operation is provided, the operation histories provided in the rows a1 to a3 and the rows b1 to b3 in the table of the example of FIG. 6 are already registered in the history information DB 104 of the management server 10. Furthermore, basic processing performed by the client terminal 20 and the management server 10 in this case is performed in accordance with the procedures illustrated in the examples of FIGS. 8 and 11 similarly to the case where the foregoing "DELIVERY" operation and "RECEIPT" operation are performed.

Figure 15:
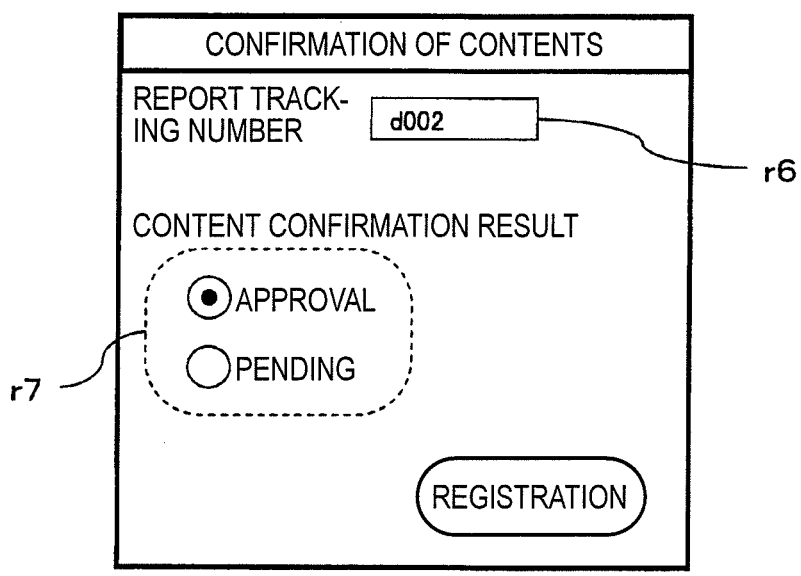
FIG. 15 is a diagram illustrating an example of a display screen for receiving input of a report ID that is subject to a confirmation operation.

When registration of a history of a "CONFIRMATION" operation is desired, the user of the client terminal 20 selects the operation type "CONFIRMATION" upon presentation of the display screen in the example of FIG. 3 in Step S10 of the procedure in the example of FIG. 8. In response to this selection, the display process unit 208 of the client terminal 20 allows the display device to provide a display screen for receiving input of a report ID and input of a confirmation result (Step S12 of FIG. 8). An example of this display screen is illustrated in FIG. 15. A region r6 of the display screen in the example of FIG. 15 serves as a report ID input box. The user inputs a report ID, which is to be confirmed, in the region r6. Moreover, in a region r7 surrounded by a broken line, selection of either "APPROVAL" or "PENDING" is received as a result of confirmation of contents of a report. When the contents are approved as a result of confirmation of the contents of the report, the user makes an input to select "APPROVAL", and when the contents are not approved as a result of confirmation of the contents of the report, the user makes an input to select "PENDING".

Upon input of a report ID and a content confirmation result by the user on the display screen in the example of FIG. 15 (Step S14 of FIG. 8), the history registration instruction unit 206 of the client terminal 20 transmits, to the management server 10, a history registration instruction including the inputted report ID and content confirmation result (Step S16). In the example of the present embodiment, the history registration instruction unit 206 provides the history registration instruction including, as the operation type, "APPROVAL" or "PENDING" selected as a result of a "CONFIRMATION" operation. For example, in FIG. 15, the report ID "d002" is inputted in the region r6, and "APPROVAL" is selected as a result of the confirmation; hence, the history registration instruction including the report ID "d002" and the operation type "APPROVAL" is transmitted to the management server 10. Note that in the example of the present embodiment, this history registration instruction further includes an operation date and time "2010 Jun. 4. 16:12:45", a user ID "userY", and an operation location "BRANCH OFFICE B".

In the management server 10 that has received, from the client terminal 20, the history registration instruction provided in Step S16, the history registration unit 106 registers a history of this operation in the history information DB 104 in accordance with the procedure in the example of FIG. 11. The operation type is identified as "APPROVAL" in Step S30 of FIG. 11, and it is determined in Step S32 that the registration requirement is satisfied, so that the determination in Step S32 is YES and the processing proceeds to Step S34. In the example of the present embodiment, since the operation type is neither "DELIVERY" (i.e., the answer is NO in Step S34) nor "RECEIPT" (i.e., the answer is NO in Step S40), none of the processes of Steps S36, S38 and S42 is performed, and operation history registration is performed in Step S44. In the example of the present embodiment, the history registration instruction provided from the client terminal 20 includes the report ID "d002", the operation type "APPROVAL", the operation date and time "2010 Jun. 4. 16:12:45", the user ID "userY", and the operation location "BRANCH OFFICE B". Using these pieces of information, the history registration unit 106 generates, in the history information DB 104, a new information record corresponding to the report ID "d002", and sets, in each entry of this information record, a value of each entry included in the history registration instruction (see a row c1 in the example of FIG. 6).

Thus far, the example of the processing for registering a history of the "CONFIRMATION" operation has been described using a specific example in which the contents of the report having the report ID "d002" are "APPROVED". When the "CONFIRMATION" operation is performed on a plurality of reports, processing similar to the foregoing processing may be carried out repeatedly for report IDs of the respective reports. In a row c2 in the table of FIG. 6, there is provided an example of an operation history, in which contents of the report having the report ID "d003" are "APPROVED" and which is registered in the history information DB 104, by performing processing similar to the foregoing processing. Further, in a row c3 in the table of FIG. 6, there is provided an example of an operation history, in which "PENDING" is selected as a result of confirmation of contents of the report having the report ID "d001" on the display screen in the example of FIG. 15 and which is registered in the history information DB 104, by performing processing similar to the foregoing processing.

<When Report that is Subject to "DELIVERY" Operation is not Identical to Report that is Subject to "RECEIPT" Operation>

In the examples of the "DELIVERY" operation and "RECEIPT" operation described above, all reports that are subject to the "DELIVERY" operation will be actually "RECEIVED" at a delivery destination. However, for some reasons such as a mistake made by the user who performs a "DELIVERY" operation and a trouble caused in the course of report transfer, there might arise a situation where a report that is subject to a "DELIVERY" operation will not be actually "RECEIVED" or a report different from one that is subject to a "DELIVERY" operation is "RECEIVED". Such a situation may be ascertained by the user by displaying, on the client terminal 20, a result of a comparison process (Step S42 of FIG. 11, and FIG. 13) performed by the comparison process unit 110 of the management server 10.

For example, consideration is given to a case where the user "userY" in the branch office B, who has received the reports having the foregoing report IDs "d001", "d002" and "d003", tries to collectively deliver, to the branch office C, the reports having the report IDs "d002" and "d003" included in the received reports, and three other reports (report IDs of which are "d004", "d005" and "d006"). By performing processing similar to that described above for registration of a history of the "DELIVERY" operation, a "DELIVERY" operation is selected (Step S10 of FIG. 8) and the report IDs "d002", "d003", "d004", "d005" and "d006" are inputted in the client terminal 20 (Steps S12 and S14). In response to this input, there is provided a history registration instruction including the operation type "DELIVERY" and the report IDs "d002", "d003", "d004", "d005" and "d006" (Step S16), and a delivery ID "s002" is assigned thereto and returned to the client terminal 20 by the management server 10 (Step S30, YES in Step S32, YES in Step S34, and Steps S36 and S38 in FIG. 11). The client terminal 20, which has received the delivery ID "s002" from the management server 10, allows the display device to provide a display screen such as one illustrated in FIG. 16, for example, in Step S18 of FIG. 8. The display screen in the example of FIG. 16 displays: the delivery ID "s002" assigned for this "DELIVERY" operation by the management server 10; the respective report IDs that are subject to the "DELIVERY" operation; and names for "NAME", which are registered in the report information DB 100 in association with the respective report IDs (and transmitted from the management server 10). Upon pressing of a "DELIVERY COVER SHEET PRINT" button on the display screen in the example of FIG. 16, a delivery cover sheet, including the delivery ID "s002" illustrated in FIG. 16, is printed by the delivery cover sheet output unit 210 of the client terminal 20 (YES in Step S20, and Step S22 in FIG. 8). Furthermore, the history registration unit 106 of the management server 10 registers, in the history information DB 104, a history of the "DELIVERY" operation for each of the report IDs "d002", "d003", "d004", "d005" and "d006" (Step S44 of FIG. 11). An example of the operation history registered in this step is provided in each of rows d1 to d5 in the table of FIG. 6. The delivery ID in a record of each of the rows d1 to d5 is "s002". Moreover, in the history information DB 104, the history registration unit 106 registers the number ("5") of the report IDs, included in the history registration instruction, in association with the delivery ID "s002" (see FIG. 7).

The following description is based on the assumption that after a history of the "DELIVERY" operation for each of the report IDs "d002", "d003", "d004", "d005" and "d006" has been registered, the report having the report ID "d001", which is not included in the registered report IDs, and the reports having the report IDs "d002", "d004" and "d006", which are part of the registered report IDs, are collectively delivered to the branch office C by the user "userY" by mistake together with a delivery cover sheet including the delivery ID "s002". Then, a user "userZ" in the branch office C, who has received these reports and delivery cover sheet, provides an instruction for "RECEIPT" operation history registration. In this case, in the client terminal 20, the delivery ID "s002" included in the received delivery cover sheet is inputted in the region r2 of the display screen in the example of FIG. 12, and the report IDs "d001", "d002", "d004" and "d006" of the received reports are inputted in the region r3 (Steps S10 to S14 of FIG. 8). Further, upon pressing of the "COMPARISON" button illustrated in FIG. 12, a history registration instruction, including the inputted delivery ID and report IDs and the operation type "RECEIPT", is transmitted to the management server 10 from the client terminal 20, and a comparison process and "RECEIPT" operation history registration are performed in the management server 10 (FIGS. 11 and 13). Since the operation type is "RECEIPT", the comparison process is stared by the comparison process unit 110 (YES in Step S40 of FIG. 11, Step S42, and FIG. 13), and report IDs included in a group corresponding to the delivery ID "s002" received from the client terminal 20 are acquired from the history information DB 104 (Step S420). In the example of the present embodiment, reference is made to the rows d1 to d5 in FIG. 6, and the report IDs "d002", "d003", "d004", "d005" and "d006" in the records each including the delivery ID "s002" and the operation type "DELIVERY" are acquired from the history information DB 104. These report IDs acquired from the history information DB 104 are compared with the report IDs "d001", "d002", "d004" and "d006" acquired from the client terminal 20 (Step S422); then, it is found that the report ID "d001" acquired from the client terminal 20 is not included in the report IDs acquired from the history information DB 104, and the report IDs "d003" and "d005" acquired from the history information DB 104 are not included in the report IDs acquired from the client terminal 20. Furthermore, the report IDs "d002", "d004" and "d006" are acquired not only from the client terminal 20 but also from the history information DB 104. Besides, the comparison process unit 110 compares the number of items ("5"), registered in the history information DB 104 in association with the delivery ID "s002" acquired from the client terminal 20 (see FIG. 7), with the number ("4") of the report IDs acquired from the client terminal 20, thus determining a mismatch between these numbers. The management server 10 transmits a result of the above-mentioned comparison to the client terminal 20 in Step S424.

FIG. 17 illustrates an example of a display screen provided on the client terminal 20 (Step S18 in FIG. 8) which has received the comparison results transmitted from the management server 10 in Step S424. In a region r8 of the display screen in the example of FIG. 17, the delivery ID "s002" is displayed. Further, in a region r9, the results of the comparison process performed on the respective report IDs in the management server 10 are displayed. Referring to the region r9 of FIG. 17, in addition to the report IDs "d001", "d002", "d004" and "d006" included in the history registration instruction provided from the client terminal 20, there are displayed the report IDs "d003" and "d005" that are not included in the history registration instruction from the client terminal 20 but are acquired from the history information DB 104 in the comparison process. Furthermore, for the report ID "d001", there is displayed a message "X NOT INCLUDED IN LIST" indicating that the report ID "d001" is not included in a group corresponding to the delivery ID "s002" (i.e., the report ID "d001" has not been acquired from the history information DB 104). For each of the report IDs "d002", "d004" and "d006", a message "O RECEIVED" is displayed because these report IDs are included in a group corresponding to the delivery ID "s002". Moreover, for each of the report IDs "d003" and "d005", there is displayed a message "X NOT RECEIVED" indicating that these report IDs are not included in the history registration instruction for the "RECEIPT" operation although these report IDs are included in a group corresponding to the delivery ID "s002". Besides, in a region r10, there is displayed a message "THE NUMBERS OF ITEMS DO NOT MATCH" indicating that there is a mismatch between the number of the report IDs included in a group corresponding to the delivery ID "s002" and the number of the report IDs included in the history registration instruction.

The user who has confirmed the display screen such as one illustrated in FIG. 17 ascertains, from the reports received by the user himself or herself, the report that should not be received (i.e., the report ID "d001"), the reports that have been received as intended by a sender (i.e., the report IDs "d002", "d004" and "d006"), and the reports that should be received but are not received (i.e., the report IDs "d003" and "d005"). Upon pressing of a "REGISTRATION" button on the display screen in the example of FIG. 17 by the user, information indicative of this operation is transmitted to the management server 10 from the client terminal 20, and in response to this, the history registration unit 106 of the management server 10 registers each history of the "RECEIPT" operation in the history information DB 104 (Step S44 of FIG. 11). In the example of the present embodiment, the history registration unit 106 generates new information records in the history information DB 104 not only for the report IDs included in the history registration instruction provided from the client terminal 20 but also for the report IDs that are acquired from the history information DB 104 in the comparison process but are not included in the history registration instruction, and the history registration unit 106 sets values of the respective entries. In each of rows e1 to e6 in the table of FIG. 6, an example of a history registered in this case is provided. Referring to each of the rows e1 to e6 in the table of FIG. 6, information indicative of the result of the comparison process is set as a value of the entry of "RECEIPT STATUS" in association with each report ID. The value of the entry of "RECEIPT STATUS" corresponds to the message displayed for each report ID in the region r9 of the display screen in the example of FIG. 17.

<Registration of History of "RETURN" Operation>

In the example of the present embodiment, the user may return a report, which has been once received, to a delivery source. For example, when a report that should not be received is received as indicated in the history (including the report ID "d001", the operation type "RECEIPT" and the receipt status "NOT INCLUDED IN LIST") provided in the row e1 of FIG. 6 in the foregoing example, the user returns this report by sending it back to the delivery source. The following description will be made on exemplary processing performed by the client terminal 20 and the management server 10 when a history of a "RETURN" operation for such a report is registered. Also in the example of the present embodiment, as basic procedures of the processing performed by the client terminal 20 and the management server 10, the procedures illustrated in FIGS. 8 and 11 may be used similarly to each of the foregoing examples. Further, the following description will be made using an example in which the user "user Z" in the branch office C, who has received the report (i.e., the report ID "d001") concerning the history provided in the row e1 of FIG. 6, will "RETURN" this report to the branch office B that is a delivery source.

In the client terminal 20c, the user "user Z" makes an input indicative of a desire for registration of a history of a "RETURN" operation, thereby starting the processing of the procedure in the example of FIG. 8 and providing the display screen illustrated in the example of FIG. 3. The user selects the "RETURN" operation (Step S10). The operation information receiving unit 204 of the client terminal 20c, which has received this input, issues a request to the display process unit 208 to provide a display screen for receiving input of a report ID that is subject to the "RETURN" operation (Step S12). In this case, input of a report ID is received through a display screen illustrated in FIG. 18. The display screen in the example of FIG. 18 includes: a region r11 serving as an input box for a report ID of a report that is subject to "RETURN"; and a region r12 serving as an input box for a delivery ID of a delivery cover sheet attached to the report that is subject to "RETURN". In the example of the present embodiment, the report ID of the report that is subject to "RETURN" is "d001", and the delivery ID of the delivery cover sheet attached to this report is "s002" (see the row e1 of FIG. 6). Hence, in FIG. 18, the report ID "d001" is inputted in the region r11, and the delivery ID "s002" is inputted in the region r12. Upon reception of the input of the report ID and the delivery ID by the operation information receiving unit 204 (Step S14 of FIG. 8), a history registration instruction, including the operation type "RETURN", the report ID "d001" and the delivery ID "s002", is transmitted to the management server 10 by the history registration instruction unit 206 (Step S16).

In response to the history registration instruction transmitted from the client terminal 20c, the management server 10 registers, in the history information DB 104, the history of this "RETURN" operation in accordance with the procedure illustrated in the example of FIG. 11. An example of the history registered in this case is provided in a row f1 in the table of FIG. 6. In the example of the present embodiment, when the operation type is "RETURN", the value of the entry of the receipt status in the record of the history information DB 104, corresponding to this history, is set to "RETURNED" by the history registration unit 106 of the management server 10. For example, the management server 10 may notify the client terminal 20c of information indicative of completion of registration of the "RETURN" operation history, and may allow this information to be displayed on the client terminal 20c (Step S18 of FIG. 8).

<Operation History Search and Display>

Thus far, the exemplary processing performed when an operation history for each of the operation types "DELIVERY", "RECEIPT", "CONFIRMATION" and "RETURN" illustrated in FIG. 3 is registered in the history information DB 104 of the management server 10 has been described. The system in the example of the present embodiment performs processing for searching for operation histories, which are generated and stored in the history information DB 104 by history registration as described in each of the foregoing examples, in accordance with various search criteria, and for presenting the search results to the user.

For example, the history search instruction unit 212 of the client terminal 20 receives a search criterion inputted by the user, and transmits a search instruction including this search criterion to the management server 10. The history search unit 112 of the management server 10, which has received this search instruction, searches the history information DB 104 for an operation history that meets the received search criterion, and returns a result of this search to the client terminal 20 via the output process unit 114.

In one specific example, at the time when descriptions of data including the rows a1 to f1 in the table of FIG. 6 have been registered in the history information DB 104 (i.e., at the time when the history of the foregoing "RETURN" operation for the report ID "d001" has been registered), the history search instruction unit 212 of the client terminal 20 receives the following search criterion: "the latest "RECEIPT STATUS" of each report "RECEIVED" together with the delivery cover sheet having the delivery ID "s002"". The history search instruction unit 212 transmits, to the management server 10, a search instruction including this search criterion, and in response to this, the history search unit 112 of the management server 10 searches the history information DB 104 for operation histories that meet the above-mentioned search criterion.

The search performed by the history search unit 112 may be performed in accordance with the following procedure, for example. First, the history search unit 112 identifies, in the history information DB 104, records in which the delivery ID is "s002" and the value set in the entry of the receipt status is not null. In the example of the present embodiment, seven records of the rows e1 to e6 and f1 in the table of FIG. 6 are identified. Moreover, for each of the report IDs included in the identified records, the history search unit 112 selects, from among the identified records, the record in which the value of the operation date and time is the latest one, thus determining the selected record as a search result. When there exists only one record, including a given report ID, in the identified records, this record may be selected for this report ID. On the other hand, when there exist a plurality of records, each including a given report ID, in the identified records, the record in which the operation date and time is the latest one may be selected from the plurality of records each including this report ID. In the example of the present embodiment, each of the report IDs "d002", "d003", "d004", "d005" and "d006" is included in only one record (see the rows e2 to e6), and therefore, the records including these report IDs are selected as search results. Further, since there exist two records each including the report ID "d001" (i.e., the rows e1 and f1), the record (i.e., the row f1) in which the operation date and time is the latest one in these records is selected as a search result. Besides, the history search unit 112 sends the values of the entry of "RECEIPT STATUS" in the records, selected as the search results for the respective report IDs, back to the client terminal 20 via the output process unit 114.

For the search results obtained in accordance with the search criterion inputted by the user, the display process unit 208 of the client terminal 20 that has received the search results from the history search unit 112 provides, on the display device, a display screen illustrated in FIG. 19, for example. The display screen in the example of FIG. 19 displays: the delivery ID "s002"; and the values of the receipt status included in the records selected as the search results for the report IDs "d001", "d002", "d004", "d006", "d003" and "d005". More specifically, the receipt status "RETURNED" is displayed for the report ID "d001" (see the row f1 of FIG. 6), the receipt status "RECEIVED" is displayed for each of the report IDs "d002", "d004" and "d006" (see the rows e2 to e4), and the receipt status "NOT RECEIVED" is displayed for each of the report IDs "d003" and "d005" (see the rows e5 and e6). With the display provided in the example of FIG. 19, the user ascertains the "RETURN" operation performed on the report having the report ID "d001", which should not have been received but have been received, for example.

Although the example of the search criterion including a delivery ID has been described thus far, a search criterion including a report ID may be used in another example. For example, the user may wish to confirm operation histories for the reports having the report IDs "d003" and "d005", for each of which the receipt status "NOT RECEIVED" is displayed on the display screen in the example of FIG. 19. In such a case, in the client terminal 20, the user may input the following search criterion: "operation histories of the report IDs "d003" and "d005"", for example, and a search instruction including this search criterion may be transmitted to the management server 10 by the history search instruction unit 212. In response to this search instruction, the history search unit 112 of the management server 10 searches the history information DB 104 for records including the report IDs "d003" and "d005", and returns, to the client terminal 20, the records obtained as search results. When the records illustrated in the rows a1 to f1 in the table of FIG. 6 are registered in the history information DB 104, details illustrated in the rows a3, b3, c2, d2 and e5 each including the report ID "d003", and details illustrated in the rows d4 and e6 each including the report ID "d005" are returned as the search results to the client terminal 20 and displayed thereon. Alternatively, for example, instead of using a search criterion for searching for all operation histories of the report IDs "d003" and "d005", a search criterion for searching for only the latest ones may be used. In such an example, only details of the records, in each of which the value of an operation date and time is the latest among the records including each report ID, are returned as the search results to the client terminal 20.

The search and display for operation histories may not only be performed in accordance with a search instruction provided from the client terminal 20, but also be performed in accordance with results of a comparison process performed by the comparison process unit 110 of the management server 10. For example, reference may be made to the results of the comparison process in the example of FIG. 17, a search may be made through the history information DB 104 to acquire operation histories of the respective report IDs of the reports (i.e., the report IDs "d001", "d003" and "d005") for each of which the result other than "RECEIVED" has been obtained, and then the acquired operation histories may be transmitted to the client terminal 20. For example, the client terminal 20 displays the received operation histories together with the results of the comparison process illustrated in the example of FIG. 17. With such display, the operation histories of the report that has been "RECEIVED" against the intention of the user who has registered the "DELIVERY" operation history, and the reports that have not been "RECEIVED" against the intention of this user are presented to the user who has provided an instruction for registration of the "RECEIPT" operation history.

<Examples of Processes when Registration Requirement is not Satisfied>

Hereinafter, an example of a determination process of Step S32 in the procedure illustrated in the example of FIG. 11, performed by the management server 10 at the time of operation history registration, and examples of processes performed when the determination made in Step S32 is NO will be described. In one specific explanatory example, the registration requirement is that "in operation histories that have already been registered in the history information DB 104, there exists no operation history having a combination of a report ID, an operation type, a user ID and an operation location identical to that of a report ID, an operation type, a user ID and an operation location for which a history registration instruction is provided". Further, the following description is based on the assumption that in the history information DB 104 of the management server 10, the histories of data descriptions from the rows a1 to f1 in the table of FIG. 6 are registered.

Consideration is now given to a case where for the report ID "d003" (see the rows d2 and e5 in the table of FIG. 6) which has been intended to be delivered to the branch office C by the user "user Y" in the branch office B but has not been actually delivered, this user "user Y" provides an instruction for registration of the "DELIVERY" operation history again. A procedure for processing from the step of receiving input of the user in the client terminal 20 to the step of providing a history registration instruction is similar to that of the processing described in the foregoing example of the "DELIVERY" history registration. In the example of the present embodiment, the history registration instruction provided from the client terminal 20 includes: the report ID "d003"; the operation type "DELIVERY"; the user ID "user Y"; and the operation location "BRANCH OFFICE B". In the management server 10 that has received this history registration instruction, the registration requirement determining unit 1060 determines whether or not the information included in the history registration instruction satisfies the registration requirement in Step S32 of the procedure in the example of FIG. 11. The registration requirement determining unit 1060 makes reference to the data descriptions (the rows a1 to f1 in the table of FIG. 6) in the history information DB 104, thereby searching for a record including a combination of the report ID, the operation type, the user ID and the operation location identical to a combination of the report ID "d003", the operation type "DELIVERY", the user ID "user Y" and the operation location "BRANCH OFFICE B" which are included in the history registration instruction. As such a record, the record provided in the row d2 of FIG. 6 is obtained in the example of the present embodiment. Hence, the registration requirement set in the foregoing example is not satisfied. Consequently, in the example of the present embodiment, the determination made in Step S32 of FIG. 11 is NO, and the procedure proceeds to Step S46. In Step S46, the history registration unit 106 confirms a decision made on whether to allow a registration process performed in accordance with the history registration instruction that is to be executed at present.

In the example of the present embodiment, via the output process unit 114, the history registration unit 106 transmits, to the client terminal 20, information indicating that the similar "DELIVERY" operation has already been registered for the report ID "d003" concerning the history registration instruction in Step S46. Moreover, the history registration unit 106 also transmits: the delivery ID "s002" (see the row d2 of FIG. 6) corresponding to the already-registered "DELIVERY" operation; and the name "CCC" (see FIG. 5) registered in the report information DB 100 in association with the report ID "d003". FIG. 20 illustrates an example of a display screen provided on the client terminal 20 that has received the information transmitted from the history registration unit 106. On the display screen in the example of FIG. 20, the report ID "d003" and the name "CCC" associated therewith are displayed (see a region r13), and a message saying that "REPORT "d003" HAS ALREADY BEEN DELIVERED" and the delivery ID "s002" are displayed.

The user who has confirmed the display screen in the example of FIG. 20 uses the input apparatus of the client terminal 20 to press a "REGISTER" button or a "DON'T REGISTER" button. Information indicating that either the "REGISTER" button or the "DON'T REGISTER" button is pressed is transmitted to the management server 10 from the client terminal 20. When the "DON'T REGISTER" button is pressed, no operation history is registered in the management server 10, and the procedure in the example of FIG. 11 ends (i.e., the determination made in Step S48 is NO).

When the "REGISTER" button on the display screen in the example of FIG. 20 is pressed, the management server 10 acquires, from the history information DB 104, the latest receipt status of each of the reports (having the report IDs "d002", "d004", "d005" and "d006") other than the report having the report ID "d003" among the reports included in the group of the delivery ID "s002" corresponding to the "DELIVERY" operation that has already been registered for the report ID "d003". In the example of the present embodiment, the receipt status "RECEIVED" is acquired for each of the report IDs "d002", "d004" and "d006" (see the rows e2 to e4 of FIG. 6), and the receipt status "NOT RECEIVED" is acquired for the report ID "d005" (see the row e6). Furthermore, the management server 10 acquires, from the report information DB 100, names in "NAME" which are associated with the report IDs of these reports (see FIG. 5). Then, the acquired receipt statuses and names are transmitted to the client terminal 20. An example of a display screen provided on the client terminal 20 that has received these receipt statuses and names is illustrated in FIG. 21.

The display screen in the example of FIG. 21 displays: the report ID "d003" concerning the history registration instruction and the name "CCC" associated with this report ID "d003" (see a region r14); the delivery ID "s002" corresponding to the already-registered "DELIVERY" operation; and the names and receipt statuses of the report IDs "d002", "d004", "d005" and "d006" included in the group of this delivery ID "s002". Further, a "YES" button and a "NO" button are displayed below a message saying that "WILL YOU REGISTER THE ABOVE DESCRIPTIONS?". The user who has confirmed the display screen in the example of FIG. 21 presses the "YES" button or the "NO" button by using the input apparatus, and information indicating that either the "YES" button or "NO" button is pressed is transmitted to the management server 10 from the client terminal 20. When the "YES" button is pressed, assuming that the operation type is "REDELIVERY" for the report ID "d003", the process of Step S34 and the subsequent processes in the example of FIG. 11 are carried out to perform history registration in the management server 10 (i.e., the determination made in Step S48 is YES). When the "NO" button is pressed, the processing of the procedure in the example of FIG. 11 ends without performing operation history registration in the management server 10 (i.e., the determination made in Step S48 is NO).

The following description is made on the assumption that the user, who has confirmed the receipt status "NOT RECEIVED" of the report ID "d005" on the display screen in the example of FIG. 21, presses the "NO" button. In response to the pressing of the "NO" button, the management server 10 ends the processing of the procedure illustrated in the example of FIG. 11. Thereafter, this user delivers, to the branch office C, not only the report having the report ID "d003" but also the report having the report ID "d005", the receipt status of which has been "NOT RECEIVED". For registration of the history of this "DELIVERY" operation, in the client terminal 20, the user provides an instruction for registration of the history of the "DELIVERY" operation to be performed on the report IDs "d003" and "d005" similarly to the foregoing example. In this case, the history registration instruction transmitted to the management server 10 from the history registration instruction unit 206 of the client terminal 20 includes: the report IDs "d003" and "d005"; the operation type "DELIVERY"; the user ID "user Y"; and the operation location "BRANCH OFFICE B". In response to this history registration instruction, a registration requirement determining process similar to that of the foregoing example (Step S32 of FIG. 11) is performed in the management server 10. The "DELIVERY" history including the same user ID and operation location has already been registered for each of the report IDs "d003" and "d005" in the history information DB 104 (see the rows d2 and d4 of FIG. 6); therefore, the determination made in Step S32 of FIG. 11 is NO, and in Step S46, a process for confirming a decision made on whether to allow registration is performed similarly to the foregoing example. Also in the example of the present embodiment, in Step S46, display screens similar to those illustrated in FIGS. 20 and 21 are provided on the client terminal 20. It is to be noted that in the region r13 of FIG. 20 and the region r14 of FIG. 21, the report IDs "d003" and "d005" and the names "CCC" and "EEE" associated therewith are displayed, and in FIG. 21, the receipt status "RECEIVED" is displayed for each of the report IDs "d002", "d004" and "d006" for which the history registration instruction is not provided. In the example of the present embodiment, the "REGISTER" button is pressed in FIG. 20, and the "YES" button is pressed in FIG. 21. In response to this, history registration is performed in the management server 10 for the report IDs "d003" and "d005" in accordance with the history registration instruction. In the example of the present embodiment, since the delivery ID "s002" has already been assigned to the "DELIVERY" operation concerning the history registration instruction, the management server 10 changes the operation type from "DELIVERY" to "REDELIVERY" without assigning any new delivery ID in performing history registration. Examples of the histories registered in the history information DB 104 as described above are provided in rows g1 and g2 of FIG. 6. Referring to the rows g1 and g2, the values of the report IDs are "d003" and "d005" in the rows g1 and g2, respectively, the value of the operation type is "REDELIVERY" in each of the rows g1 and g2, and the value of the delivery ID is "s002" in each of the rows g1 and g2.

When history registration is performed with the operation type set to "REDELIVERY", the management server 10 in the example of the present embodiment transmits, to the client terminal 20, the report IDs on which the history registration instruction is provided, the names associated with these report IDs, the delivery ID that has already been assigned to these report IDs, and the receipt statuses and names of the other report IDs included in the group of this delivery ID. Upon reception of the information transmitted in this manner, the client terminal 20 allows the information received from the management server 10 to be displayed as contents of a delivery cover sheet attached to the reports in "REDELIVERY". In the example of the present embodiment, a display screen illustrated in FIG. 22 is displayed. The display screen illustrated in the example of FIG. 22 displays: the report IDs "d003" and "d005" for which the history registration instruction is provided; the names associated with these report IDs; and the already-assigned delivery ID "s002". Moreover, along with a message "THE FOLLOWING REPORTS HAVE ALREADY BEEN RECEIVED" indicating that the "RECEIPT" operation has been completed for the other report IDs "d002", "d004" and "d006" included in the group of the delivery ID "s002", the display screen in FIG. 22 displays the name associated with each of these report IDs. Upon pressing of a "DELIVERY COVER SHEET PRINT" button on the display screen in the example of FIG. 22, the delivery cover sheet output unit 210 of the client terminal 20 outputs a delivery cover sheet on which the contents illustrated in FIG. 22 are printed. This delivery cover sheet is attached to the reports having the report IDs "d003" and "d005" and is delivered to the destination branch office C.

In response to an instruction provided from the user who has received the "REDELIVERED" reports and the delivery cover sheet as mentioned above, the comparison process unit 110 of the management server 10 performs a comparison process on the report IDs "d003" and "d005" and the delivery ID "s002" concerning the "RECEIPT" operation (Step S42 of FIG. 11, and FIG. 13) similarly to the example of the "RECEIPT" operation history registration described above. In the example of the present embodiment, in Step S420 of FIG. 13, the comparison process unit 110 acquires, from the history information DB 104, the report IDs "d002", "d003", "d004", "d005" and "d006" in the records each including the delivery ID "s002" and the operation type "DELIVERY". These report IDs are compared with the report IDs "d003" and "d005" acquired from the client terminal 20 (Step S422). Then, it is found that the report IDs "d003" and "d005" are both included in the report IDs acquired from the history information DB 104. Further, for the report IDs acquired from the history information DB 104, a search is made through the history information DB 104 for the receipt statuses of the report IDs that are not acquired from the client terminal 20

Figure 23:
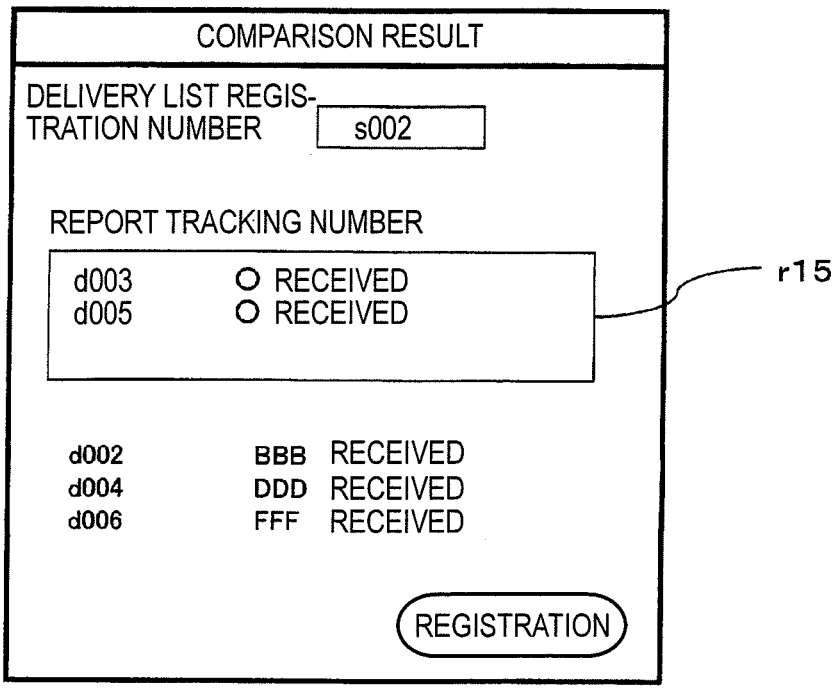
FIG. 23 is a diagram illustrating still another example of a display screen for displaying results of a comparison process.

(i.e., the report IDs "d002", "d004" and "d006"), and then it is found that the receipt statuses of all of these report IDs are "RECEIVED" (see the rows e2 to e4 in the table of FIG. 6). The management server 10 transmits, to the client terminal 20, results of the comparison with the report IDs "d003" and "d005" and the receipt statuses of the other report IDs (Step S424). An example of a display screen provided on the client terminal 20 in response to this transmission is illustrated in FIG. 23. The display screen in the example of FIG. 23 displays: the comparison result "O RECEIVED" for each of the report IDs "d003" and "d005" concerning the history registration instruction (region r15); and the receipt status of each of the other report IDs "d002", "d004" and "d006" included in the group of the delivery ID "s002". Upon pressing of a "REGISTRATION" button on the display screen in the example of FIG. 23, notification of pressing of the "REGISTRATION" button is provided from the client terminal 20 to the management server 10, and the history registration unit 106 registers, in the history information DB 104, "RECEIPT" operation histories for the report IDs "d003" and "d005". Examples of these histories are provided in rows h1 and h2 of FIG. 6.

The above description has been made on the example in which the registration requirement is that "in operation histories that have already been registered in the history information DB 104, there exists no operation history having a combination of a report ID, an operation type, a user ID and an operation location identical to that of a report ID, an operation type, a user ID and an operation location for which a history registration instruction is provided". In another example, a registration requirement may be set in accordance with the operation type. For example, a requirement set as a registration requirement for a "RETURN" operation is that "a history of a "RECEIPT" operation exists in the history information DB 104 for a report ID concerning a history registration instruction". Normally, a report that has not been "RECEIVED" will not be "RETURNED", and therefore, such a requirement may conceivably be set as a registration requirement for a history of a "RETURN" operation.

<Modifications and so Forth>

The examples of the embodiment described above are not intended to limit the embodiment of the present invention, but various modifications may be made in addition to the foregoing examples. For example, specific forms of descriptions of data stored in the report information DB 100 and the history information DB 104 are not limited to those of the foregoing examples. In the report information DB 100 and the history information DB 104, descriptions of data including entries different from those of the examples illustrated in FIGS. 5 to 7 may be registered. For example, in the history information DB 104, registration of "RECEIPT STATUS" may be omitted. Even when no receipt status is registered in the history information DB 104, results of a comparison process may be displayed similarly to the foregoing examples (FIGS. 14 and 17).

Further, in the foregoing example of the embodiment, comparison process results are displayed on the client terminal 20 of the user who has provided an instruction for a "RECEIPT" operation history registration. In one modification, the management server 10 may perform a process for notifying a preset notification destination of comparison process results. For example, a notification destination is registered in advance in association with each user ID or each operation location, and notification of results of a comparison process is provided to the notification destination corresponding to the user ID or operation location included in a "DELIVERY" operation history associated with a delivery ID used in the comparison process. A notification destination may be an e-mail address, a fax number or the like. When an e-mail address is registered as a notification destination, an e-mail including comparison process results may be transmitted to this e-mail address, and when a fax number is registered as a notification destination, a document including comparison process results may be faxed. Alternatively, a plurality of notification destinations may be registered for each user ID or each operation location. For example, upon notification of comparison process results to the user who has registered a "DELIVERY" operation history, this user will ascertain whether or not a report has been "RECEIVED" as intended. Furthermore, notification of comparison process results may be provided only when a "RECEIPT" operation, which is against the intention of the user who has performed a "DELIVERY" operation, is performed. In other words, no notification may be provided when reports that are subject to a "DELIVERY" operation and reports that are subject to a "RECEIPT" operation are all identical to each other, and notification may be provided only when a non-identical report exists. Note that in the modification in which notification of comparison results is provided, an operation history of a report, which causes a mismatch between reports that are subject to a "DELIVERY" operation and reports that are subject to a "RECEIPT" operation, is acquired from the history information DB 104, and notification of this operation history may be provided together with comparison results.

Moreover, the report ID of each report is generated and assigned by the client terminal 20 in the example of the foregoing embodiment, but a report ID may be assigned by the management server 10 in one modification. In this modification, when a new report is generated, the report generation unit 200 of the client terminal 20 issues a request to the management server 10 to generate a new report ID. Upon reception of this request, the management server 10 generates the new report ID that is unregistered in the system, and returns the generated report ID to the client terminal 20. The report generation unit 200 of the client terminal 20 that has received this report ID generates the new report on which the received report ID is printed. Also in this modification, the various processes described in the example of the foregoing embodiment may each be carried out in a manner similar to that described above.

Besides, in one modification, the delivery ID assigning unit 108 may be provided in the client terminal 20 instead of providing the delivery ID assigning unit 108 in the management server 10. In this modification, upon reception of an instruction for registration of a "DELIVERY" operation history, the client terminal 20 generates a delivery ID corresponding to this "DELIVERY" operation, and transmits, to the management server 10, a history registration instruction including this delivery ID and one or more report IDs. In the management server 10, instead of assigning the delivery ID by the management server 10 itself, the delivery ID included in the history registration instruction may be registered in a record of a history of this delivery operation in the history information DB 104. In this modification, when a delivery ID has already been assigned for a "DELIVERY" operation concerning the history registration instruction (i.e., when the registration requirement is not satisfied), in the process for confirming a decision made on whether to allow registration (Step S46 of FIG. 11), the already-assigned delivery ID is transmitted to the client terminal 20 from the management server 10 to make an inquiry about whether or not registration is allowed in a manner similar to that described with reference to FIGS. 20 and 21 in the foregoing example. Then, when registration is allowed, the management server 10 abandons the delivery ID assigned by the client terminal 20 and included in the history registration instruction, and registers a history of a "REDELIVERY" operation using the already-assigned delivery ID in a manner similar to that described with reference to FIG. 22 in the foregoing example.

Further, each of the systems according to the foregoing embodiment and various modifications thereof may operate in conjunction with a workflow system for managing a procedure of operations performed using report(s). For example, it is conceivable that when an operation history is registered in the history information DB 104, the workflow system may be notified of details of this registration and a process necessary for management of operations may be carried out using the notified operation history in the workflow system. For example, when whether or not delivered report(s) has/have been appropriately received is managed in the workflow system, the system of the example of the present embodiment notifies the workflow system of comparison process result(s), thus allowing a receipt confirmation process to be performed in the workflow system. Alternatively, when approval or disapproval of a report is managed by the workflow system, for example, the system of the example of the present embodiment notifies the workflow system of an operation history including the operation type "APPROVAL" or "PENDING", and then an approval confirmation process is performed in the workflow system.

Figure 24:
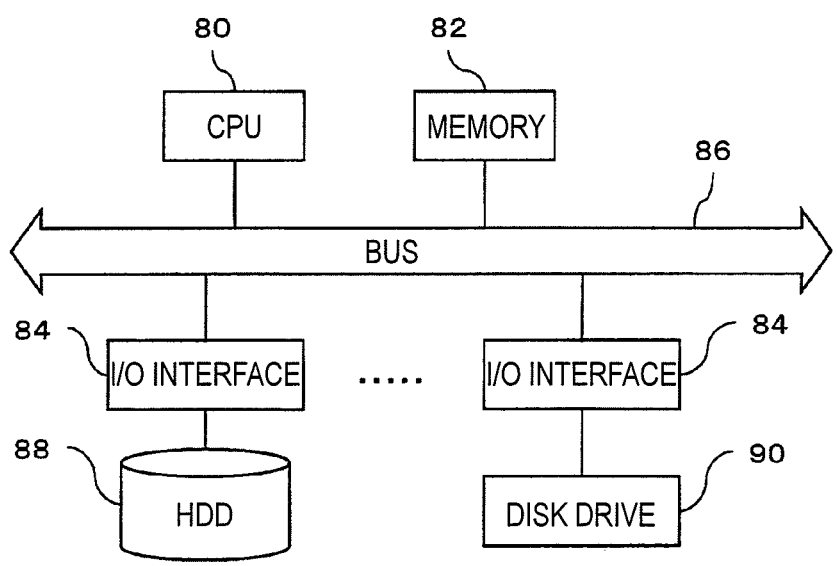
FIG. 24 is a block diagram illustrating an example of a hardware configuration of a computer.

The above-described management server 10 is typically implemented by executing, on a general-purpose computer, a program describing functions or processing details of the respective units of the foregoing management server 10. As illustrated in FIG. 24, the computer, for example, has a circuit configuration in which hardware devices such as a CPU (Central Processing Unit) 80, a memory (first storage) 82 and various I/O (input/output) interfaces 84 are connected to each other via a bus 86. Furthermore, a HDD (Hard Disk Drive) 88 and a disk drive 90 for reading data from portable nonvolatile recording media compliant with various standards, such as a CD, a DVD and a flash memory, are connected to the bus 86 through the I/O interfaces 84, for example. The above-mentioned drive 88 or 90 functions as an external storage device for the memory. Via a recording medium such as a CD or DVD or via a network, the program describing the processing details of the present embodiment is stored in a fixed storage device such as the HDD 88 and is installed on the computer. The program stored in the fixed storage device is read into the memory and is executed by the CPU, thereby realizing the processing of the present embodiment. The same goes for the client terminal 20.

Note that although the exemplary embodiment in which the management server 10 is implemented by the single computer has been described above, the various functions of the management server 10 in the foregoing examples may be distributed and implemented in a plurality of computers.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A report management system comprising:
a first receiving unit that receives input of report identification information assigned to each of one or more reports to be collectively delivered to a receiver from a sender;
an assigning unit that assigns group identification information to a group of the one or more reports to be collectively delivered, the group identification information being assigned to identify the group;
a registration unit that registers, in a storage unit, the group identification information and each piece of the report identification information, received by the first receiving unit for each report of the group having the group identification information, in such a manner that the group identification information and the report identification information are associated with each other;
an attached document generation unit that generates an attached document that is a document including the group identification information and is to be attached to a report delivered to the receiver from the sender;
a second receiving unit that receives, upon reception of one or more reports by the receiver from the sender together with the attached document, input of the group identification information included in the attached document received by the receiver, and the report identification information of each of the one or more reports received by the receiver together with the attached document; and
an output unit that outputs information indicative of a result of comparison made between the report identification information stored in the storage unit in association with the group identification information received by the second receiving unit, and the report identification information received by the second receiving unit.

2. The report management system according to claim 1,
wherein in response to a registration instruction including operation-related information serving as information related to an operation performed on a report and report identification information of the report that is subject to the operation, the registration unit further registers, in the storage unit, the operation-related information and the report identification information, included in the registration instruction, in such a manner that the operation-related information and the report identification information are associated with each other,
wherein in association with each piece of the report identification information received by the first receiving unit, the registration unit further registers, in the storage unit, operation-related information including information indicating that the report has been delivered, and
wherein in association with each piece of the report identification information received by the second receiving unit, the registration unit further registers, in the storage unit, operation-related information including information indicating that the report has been received.

3. The report management system according to claim 1,
wherein in association with each piece of the report identification information that is subject to comparison in the output unit, the registration unit further registers, in the storage unit, information indicative of a result of the comparison.

4. The report management system according to claim 2,
wherein the output unit compares a set of pieces of the report identification information, stored in the storage unit in association with the group identification information received by the second receiving unit, with a set of pieces of the report identification information received by the second receiving unit, determines the report identification information that is included in one of the sets but is not included in the other set, and further outputs information stored in the storage unit in association with the determined report identification information.

5. The report management system according to claim 2, wherein the system further comprises a determining unit that makes reference to the information stored in the storage unit, and that determines whether or not the group identification information, each piece of the report identification information, and the operation-related information, which are to be registered in the storage unit by the registration unit, satisfy a preset registration requirement, and wherein the output unit further outputs a result of the determination made by the determining unit.

6. A report management system comprising: a sender terminal utilized by a sender who delivers a report; a receiver terminal utilized by a receiver who receives a report from the sender; and a management apparatus connected to the sender terminal and the receiver terminal via a communication unit, wherein the sender terminal comprises:
a first receiving unit that receives input of report identification information assigned to each of one or more reports to be collectively delivered to the receiver from the sender;
a first transmission unit that transmits, to the management apparatus, each piece of the report identification information received by the first receiving unit; and
an attached document generation unit that receives group identification information, which is returned from the management apparatus in response to the transmission of each piece of the report identification information by the first transmission unit and by which a group including the report of each piece of the identification information is identified, and that generates an attached document that is a document including the received group identification information and is to be attached to the report delivered to the receiver from the sender, wherein the receiver terminal comprises:
a second receiving unit that receives, upon reception of one or more reports by the receiver from the sender together with the attached document, input of the group identification information included in the attached document received by the receiver, and the report identification information of each of the one or more reports received by the receiver together with the attached document; and
a second transmission unit that transmits, to the management apparatus, the group identification information and each piece of the report identification information received by the second receiving unit, and wherein the management apparatus comprises:
an assigning unit that assigns, upon reception of each piece of the report identification information transmitted from the first transmission unit of the sender terminal, the group identification information to a group including the report of each piece of the received report identification information;
a return unit that returns the group identification information to the sender terminal;
a registration unit that registers, in a storage unit, the group identification information and each piece of the report identification information, received from the sender terminal, in such a manner that the group identification information and the report identification information are associated with each other; and
an output unit that outputs, upon reception of the group identification information and each piece of the report identification information transmitted from the second transmission unit of the receiver terminal, information indicative of a result of comparison made between the report identification information stored in the storage unit in association with the received group identification information, and each piece of the received report identification information.

7. A non-transitory computer readable medium storing a computer readable program executable by a computer connected via a communication unit to: a sender terminal utilized by a sender who delivers a report; and a receiver terminal utilized by a receiver who receives a report from the sender, the process comprising:

firstly receiving, from the sender terminal, report identification information assigned to each of one or more reports to be collectively delivered to the receiver from the sender;
assigning group identification information to a group including the report of each piece of the report identification information received in the first receiving;
transmitting, to the sender terminal, the group identification information assigned in the assigning;
registering, in a storage unit, the group identification information assigned in the assigning, and each piece of the report identification information, received in the first receiving, in such a manner that the group identification information and the report identification information are associated with each other;
secondly receiving, from the receiver terminal of the receiver who has received an attached document including the group identification information and one or more reports from the sender, the group identification information included in the attached document, and the report identification information of each of the one or more reports; and
outputting information indicative of a result of comparison made between the report identification information stored in the storage unit in association with the group identification information received in the second receiving, and the report identification information received in the second receiving step.

\* \* \* \* \*